United States Patent [19]

Greenhorn et al.

[11] Patent Number: 4,479,382

[45] Date of Patent: Oct. 30, 1984

[54] SYSTEM FOR TESTING A TIRE TO AVOID A TORQUE STEER EFFECT

[75] Inventors: Richard J. Greenhorn, Stow; William R. Dutt, Copley; Leonard A. Vandale, Akron, all of Ohio; Douglas L. Winslow, Kuala Lumpur, Malaysia; David A. Glemming, Akron, Ohio; John S. Muhl, Nortron, Ohio; Michael G. Heisler, Lansing, N.Y.; Jack E. Brown, Jr., Akron, Ohio

[73] Assignee: The Goodyear Tire & Rubber Company, Akron, Ohio

[21] Appl. No.: 365,593

[22] Filed: Apr. 5, 1982

[51] Int. Cl.³ .......................................... G01M 17/02
[52] U.S. Cl. .......................................................... 73/146
[58] Field of Search ........................ 73/146, 8; 340/58

[56] References Cited

U.S. PATENT DOCUMENTS

| | | | |
|---|---|---|---|
| 2,526,056 | 10/1950 | Weston | 33/172 |
| 3,564,219 | 2/1971 | Mutziger | 235/92 |
| 3,656,239 | 4/1972 | Hutchinson et al. | 33/141 R |
| 3,895,518 | 7/1975 | Leblond | 73/146 |
| 3,941,178 | 3/1976 | Simpson et al. | 157/13 |
| 4,016,020 | 4/1977 | Ongaro | 156/75 |
| 4,078,339 | 3/1978 | Ongaro | 51/281 R |
| 4,114,279 | 9/1978 | Johnson et al. | 33/178 R |
| 4,224,597 | 9/1980 | DiCecio | 73/146 |

FOREIGN PATENT DOCUMENTS 0052809 10/1981 European Pat. Off. .
3041849 11/1980 Fed. Rep. of Germany .

Primary Examiner—Donald O. Woodiel
Attorney, Agent, or Firm—Ronald E. Larson; T. P. Lewandowski

[57] ABSTRACT

System for testing pneumatic tires. A tire that revolves under a load is deformed at the area in which it meets the roadway. Such a deformation results in the tire having an effective rolling radius that is shorter than the radius it has while static and/or unloaded. According to the invention, tires are tested by determining their effective rolling radii. When tires having similar effective rolling radii are used on an automotive vehicle, the undesirable torque steer effect is thereby reduced.

24 Claims, 16 Drawing Figures

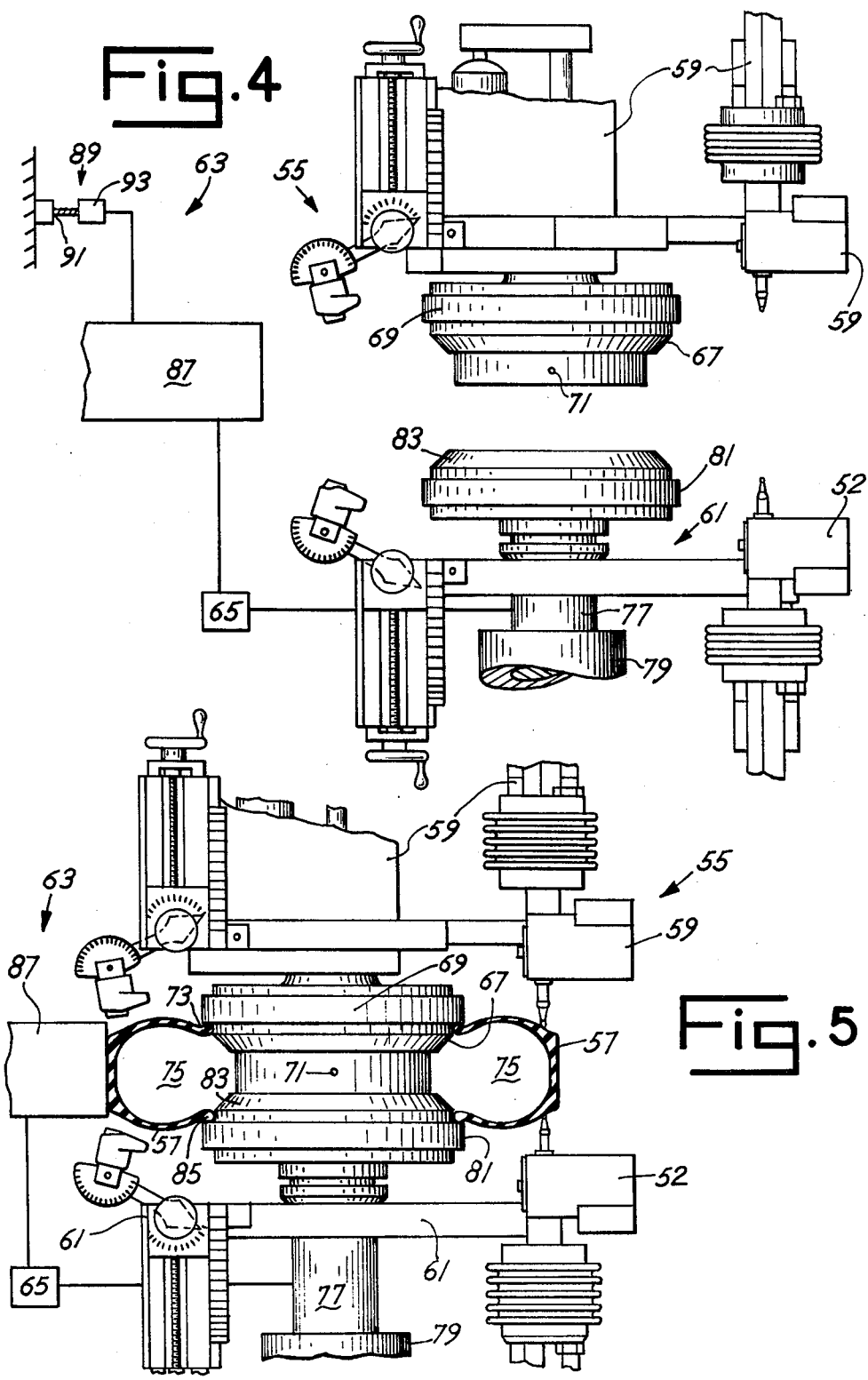

SYSTEM FOR TESTING A TIRE TO AVOID A TORQUE STEER EFFECT

BACKGROUND OF THE INVENTION

The present invention relates generally to tire testing devices and more particularly to a system for testing pneumatic tires in order to avoid a torque steer effect when the tires are used with an automotive vehicle. Torque steer generally refers to an undesirable tendancy of an automotive vehicle to move or turn laterally when torque, or thrust, is applied to its driven wheels. Torque is applied, for example, when the vehicle accelerates or decelerates.

The torque steer effect is particularly acute in cars that are steered and driven by the same wheels. "Front wheel drive" vehicles are normally steered and driven by the same wheels and accordingly are influenced by the torque steer effect. In recent years, the number of such cars produced has increased significantly. Overcoming the torque steer effect has thus become increasingly important.

SUMMARY OF THE INVENTION

In attempting to reduce the effect of torque steer, Applicants realized that torque steer could be caused by a variety of additive factors, such as plysteer or the design of the vehicle itself. They also recognized that the radius of a tire could play an important part in avoiding undesired torque steer characteristics.

The radius of a static, inflated tire changes as a load, or weight is placed on it. Applicants have noted, however, that knowledge regarding the static, loaded radius of a tire is of only limited importance in attempting to eliminate the torque steer effect.

Applicants have ascertained, however, that the radius of a tire also changes as it rotates, and particularly as it rotates under a load. This latter type of radius—the radius of a tire as it revolves under a load—is referred to as the "effective rolling" radius. It can be thought of as the radius of an imaginary, perfectly round circle that has the same circumference as the tire when the tire is revolving under a load. After substantial effort, Applicants discovered that if the "effective rolling" radius of each steerable, driving wheel is kept within a close tolerance, the torque steer effect can be significantly reduced.

Just as the radius of a tire changes as it begins to revolve under a load, the rolling circumference of a tire also, of course, changes in proportion to how the rolling radius changes. The circumference of the tire revolving under a load is referred to as the "effective rolling" circumference.

The effective rolling radius of a revolving, loaded tire cannot be accurately ascertained simply by determining the distance from the center of the tire to road surface. This is partly due to the deformation that the upper portion of the tire undergoes when it revolves under a load. The upper portion of the tire, which is not in contact with the road, tends to bulge out. As a result, the tire has a larger effective rolling circumference than is suggested by the distance between the center of the tire and the roadway. Thus, the measurement of such a distance cannot accurately indicate the tire's effective rolling circumference or effective rolling radius.

According to one feature of the present invention, a tire is inflated, a load is applied to the tire as it is revolved, and the effective rolling radius of the tire is determined. According to another feature of the present invention, the effective rolling circumference of a tire is measured to determine the tire's effective rolling radius. According to yet another feature of the invention, an apparatus carries out the methods described above.

A further feature of the invention involves a process for manufacturing tires in which tires are tested for satisfactory effective rolling radii prior to their shipment to customers. In still another feature of the invention involving the manufacture of vehicles, the effective rolling radii of tires are checked before the tires are mounted on a vehicle.

It is thus an object of the present invention to substantially reduce the torque steer effect. Other objects of the invention are:

(1) to easily and quickly determine the effective rolling radius of a tire;

(2) to conveniently measure the effective rolling circumference of a tire;

(3) to allow tires to be more closely matched before they are mounted on a vehicle and thus reduce customer complaints about the torque steer effect; and (4) to use a small number components to determine the effective rolling parameters of a tire so that the invention may be readily and inexpensively manufactured.

DESCRIPTION OF THE DRAWING

These and other objects, advantages, and features of the present invention will hereafter appear in connection with the accompanying drawing, wherein like numbers refer to like parts throughout and wherein:

FIG. 4 is a partial, front elevational view of a preferred form of the present invention, showing two chucks in a spaced relation;

FIG. 5 is a partial, front elevational view of a preferred form of the present invention, showing two chucks in a closed relation and a cross section of a tire;

DESCRIPTION OF A PREFERRED EMBODIMENT

Figure 1:
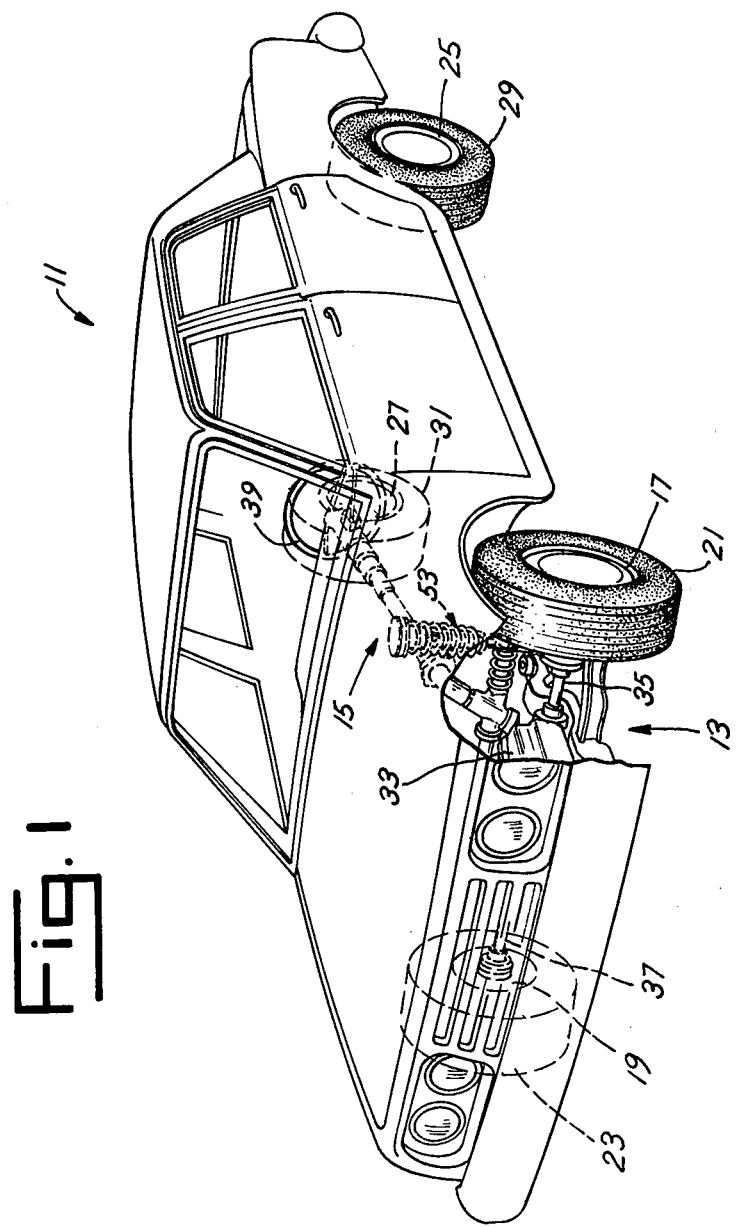
FIG. 1 is a perspective view of an automotive vehicle having two front tires that have been tested in accordance with a preferred form of the present invention.

Referring to FIG. 1, an exemplary automotive vehicle 11 having front wheel drive is shown. The automotive vehicle 11 includes a drive train assembly 13, a steering assembly 15, a set of front, steerable wheels 17, 19 and associated tires 21, 23, and a set of rear nonsteerable wheels 25, 27 and associated tires 29, 31.

The drive train assembly 13 includes a power plant 33 and two shafts 35, 37, each of which is interconnected with one of the two front wheels 17, 19 (FIG. 1). The two front wheels 17, 19 are thus rotatably driven and propel the vehicle 11.

The steering assembly 15 includes a steering wheel 39. The steering wheel 39 is connected to the two front wheels 17, 19 (FIG. 1).

Since the vehicle 11 has front wheel drive, the effect of torque steer is particularly noticeable. Thus, if the power plant 33 provides torque, or thrust, to the two front wheels 17, 19 (and the radii of the two front tires 21, 23 are not properly "matched"), the vehicle 11 will tend to move or turn laterally, even though the steering wheel 39 has not been turned. Usually, under such circumstances, the vehicle 11 tends to turn toward the tire having the smaller radius.

Applicants have discovered that if the two front tires 21, 23 are "matched" within certain tolerances, the effect of torque steer is substantially reduced. The "matching" process involves the determination of a particular type of radius of the tires 21, 23.

The profile of a fully inflated tire, standing free and unassociated with any vehicle, is defined by a dotted, circular line 41 in FIG. 2a. The radius of the dotted, circular line 41 is marked as $R_N$.

After being inflated, tires are usually mounted on a vehicle and thereafter support part of the vehicle's weight. When a tire 43 (FIG. 2a) is thus put under a "load" (not shown) and rests on a flat roadway 45, a bottom portion 47 of the tire 43 deforms, contracting to adjoin the roadway 45. The distance from a center 49 of the tire 43 to the roadway 45 is called the "load radius" and marked as $R_L$ in FIG. 2a.

After putting the load on the tire 43, the silhouette of the tire 41 is no longer round, and the circumference has decreased. The bottom portion 47 of the tire 43 is shorter than it would be if the tire 43 were in an unloaded condition; the loaded tire 43 must roll more times than an unloaded (and therefore undeformed) tire in order to cover the same distance.

An imaginary, perfectly round, circle 51 may be constructed which has the same circumference as the loaded tire 43. The radius of this circle, marked as $R_E$ in FIG. 2b, is the effective radius of the loaded tire 43. Thus, the loaded tire 43 and the circle 51 would roll the same number of times to cover the same distance.

Figure 2:
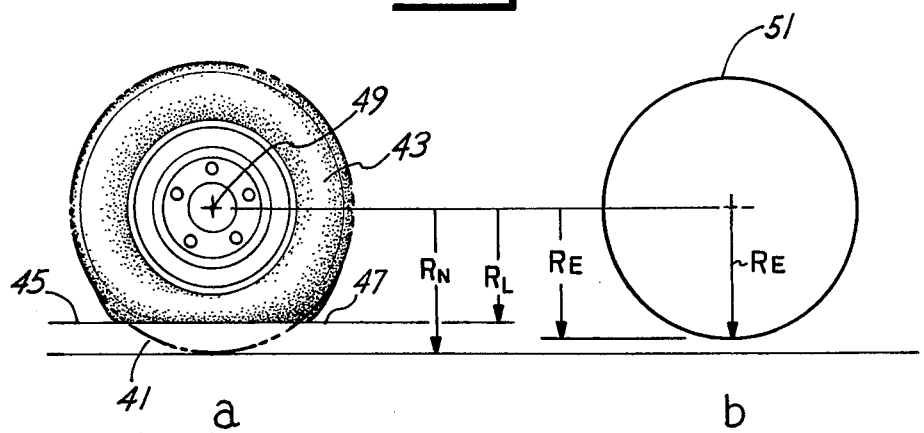
FIG. 2 is a schematic diagram illustrating, in exaggerated detail, the differences between an unloaded radius, a loaded radius, and an effective radius, in order to explain the operation of a preferred form of the present invention.

Still referring to FIG. 2, the effective radius of the tire 43 is a function, inter alia, of the air pressure within the tire 43 and how badly the tire 43 is deformed at the surface of the roadway 45. Applicants have discovered that the effective radius is also changed when the tire 43 is rotated. The effective radius of the tire 43 as it rotates is referred to herein as an "effective rolling radius."

Applicants have also discovered that if the effective rolling radii of the tires 21, 23 associated with the two steerable driving wheels 17, 19 are kept within 0.060 inch (and preferably within 0.040 inch) of each other, the torque steer effect on the vehicle 11 is substantially reduced (FIG. 1). Although other factors, such as a suspension system 53 of the vehicle 11, may affect torque steer, keeping the effective rolling radii "matched" has a dramatic effect on reducing torque steer characteristics. "Matching" tires is easily accomplished during the manufacture of the tires.

Figure 3:
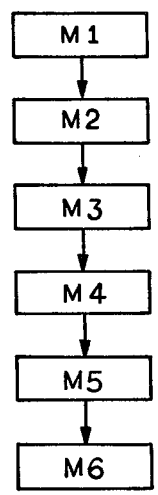
FIG. 3 is a block diagram showing the steps in manufacturing a tire according to a preferred form of the present invention.

Referring to FIG. 3, six basic steps of manufacturing a vehicle tire are shown in blocks M1-M6. In step M1, rubber compounds are mixed and some tire fabric is coated with the compounds. In addition, various component parts of the tire, such as tread and belts, are fabricated and cut to approximate sizes. In step M2, the prepared components are assembled together on a mandrel. In step M3, the assembled components are cured, thereby solidifying the component parts into a unified whole.

In step M4 (FIG. 3), the tire's characteristics are measured. This step is particularly important for tires to be used with front wheel drive cars. Thus, in this step, tires having effective rolling radii outside of a particular tolerance may be noted. Such a tolerance might equal, for example, the desired effective rolling radius of the tire, plus or minus 0.020 inch.

In step M5, tires which have particular characteristics, if any, are indicated. Two methods of indication are: (1) physically marking certain tires with appropriate indicia, or (2) separating the tires into different categories. Tires that are segregated because of a larger or small effective rolling radii may still be used if they are properly "matched." Thus, for example, two tires may each have an effective rolling radius that exceeds an arbitrary tolerance interval by the same amount. The two tires may still be used on a vehicle, so long as they are used together on either the front or rear of the same vehicle. In step M6, tires are prepared for shipment to a customer.

A portion of measuring step, M5, may be carried out by a measuring device 55, such as the one shown in FIGS. 4 and 5. By using the measuring device 55, the effective rolling radius of a vehicle tire 57 may be determined. One may accordingly mark or segregate tires that have effective rolling radii outside of a predetermined range. If only tires having an effective rolling radius within a particular range are shipped, the torque steer effect will be substantially reduced when the vehicle 11 is driven, no matter how the tires are paired together by the customer.

As shown in FIGS. 4 and 5, the measuring device 55 includes upper and lower frames 59, 61, a load assembly 63, and a counter 65. An upper chuck 67 is rotatably mounted on the upper frame 59. The upper chuck 67 includes bead seats 69 and a port 71. The bead seats 69 are suitable for tightly holding an upper side 73 of the tire 57.

The port 71 is interconnected with a supply of compressed air, a valve, and a pressure transducer (not shown). When the tire 57 (FIG. 5) is correctly placed in the measuring device 55, the valve opens and allows air to travel from the supply of compressed air, through the port 71, to an interior 75 of the tire 57. When the pressure transducer senses that the air pressure in the interior 75 has reached a predetermined level, it sends an electrical signal to the valve. The valve, in turn, closes and prevents additional air from entering the tire 57.

The lower frame 61 of the measuring device 55 supports a vertical spindle 77, substantially inside of a sleeve 79, and a lower chuck 81 (FIGS. 4 and 5). The spindle 77 is interconnected to an electric motor (not shown) and may rotate as well as move in a vertical direction. The lower chuck 81 is mounted on top of the spindle 77 and has bead seats 83 for holding a lower side 85 of the tire 57. The lower chuck 81 also is axially movable from an open, retracted position shown in FIG. 4 to a closed, extended position shown in FIG. 5.

During the operation of the measuring device 55, the upper and lower chucks 67, 81 are initially in the open position shown in FIG. 4, and the tire 57 is inserted therebetween. The lower chuck 81 then moves up toward the upper chuck 67, and the bead seats 69, 83 hold the sides 73, 85 of the tire 57 (FIG. 5). The tire 57 is then inflated via the port 71 to a pressure between 20 and 40 p.s.i. Applicants have found the pressure of 38 p.s.i. to work well. Thereafter, the lower chuck 81 is driven by the electric motor, and the upper and lower chuck 67, 81 rotate at a speed of approximately 60 r.p.m.

The load assembly 63 in the measuring device 55 includes a rolling load drum 87 and a pressure assembly 89 (FIG. 4). In one form of the preferred embodiment, the rolling load drum 87 is a cylindrical roller made of aluminum; it has a diameter of 33.625 inches and is at least as wide as the tire 57. Although a roller of different dimensions will function, it is important to the operation of the measuring device 55 that the diameter be known precisely.

In one form of the preferred embodiment shown in FIG. 4, the pressure assembly 89 includes a mechanical screw jack 91 and a gauge 93. The jack 91 revolves and pressures the rolling load drum 87 against the revolving tire 57, which, in turn, causes the rolling load drum 87 to rotate. It is preferable that the outside of the rolling load drum 87 have a high coefficient of friction so that it will not slip upon coming in contact with the revolving tire 57. In a preferred embodiment, the rolling drum 87 is coated on the outside with a fine, tungsten-carbide grit.

The rolling load drum 87 is pressed against the tire 57 with a force equal to approximately 85% of load rating of the tire 57, as set out by the U.S. Tire Rim Association. When this force is reached, the gauge 93 so indicates, and the jack 91 stops driving the rolling load drum 87 any further against the tire 57. Thus, the speed of the lower chuck 81 and the pressure of the rolling load drum 87 roughly simulate the conditions that the tire 57 would be subjected to if used with the vehicle 11.

As shown in FIG. 5, when pressed against the tire 57, the rolling load drum 87 places the tire 57 under a load. The rolling load drum 87 thereby deforms the tire 57 in a manner similar to the deformation that would take place if the tire 57 were used to support a moving vehicle. Thus, by measuring the effective rolling circumference of the tire 57 under such conditions, the effective rolling radius of the tire 57 may be determined.

The counter 65 in the measuring device 55 makes this determination. As shown in more detail in FIG. 6, the counter 65 includes a light source 95, a photosensitive detector 97, a revolution detector 99, leads 101, 103, and a processor 105.

The light source 95 is situated near the perimeter of the rolling load drum 87, which has been perforated with a series of 720 evenly-spaced holes 107 (FIG. 6), one hole for each ½ degree of rotation of the drum. As the rolling load drum 87 revolves, light from the light source 95 is intermittently blocked by the rolling load drum 87 and then allowed to pass by one of the holes 107. Thus, 720 pulses of light are created for each complete revolution of the rolling load drum 87.

The photosensitive detector 97 is positioned to receive the pulses and generate an electrical signal each time that it receives a pulse of light. The number of the pulses that the photosensitive detector 97 generates over a certain time period is a first speed signal.

The first speed signal (or "rolling load pulses") has a value that represents the rotational speed of the rolling load drum 87. The first speed signal is transmitted via the lead 101 to the processor 105.

Figure 6:
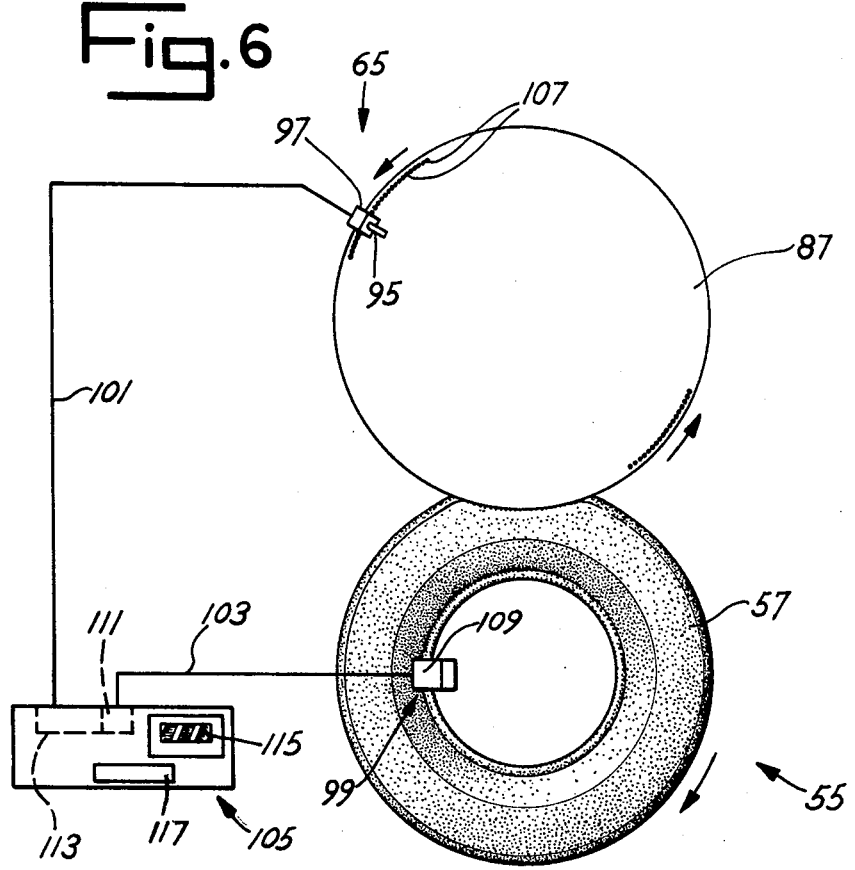
FIG. 6 is a schematic diagram illustrating the interaction of a tire and a rolling load drum in a preferred form of the present invention.

The revolution detector 99 (FIG. 6) is mounted on the spindle 77 (FIGS. 4 and 5) and provides an electrical signal representing the rotational speed of the tire 57. In one form of the preferred embodiment, the revolution detector 99 includes a pulse tachometer 109 (FIG. 6). The tachometer 109 provides 360 electrical pulses for each complete revolution of the spindle 77.

These "tire pulses" are a second speed signal that has a value which represents the rotational speed of the tire 57. The second speed signal is transmitted via the lead 103 to the processor 105.

Pulse doubler circuitry 111 creates an individual pulse for each leading and trailing edge of a pulse generated by the tachometer 109 (FIG. 6). Thus, 720 pulses are generated for each rotation of the tire 57.

The processor 105 receives the first and second speed signals and compares their values in order to determine the effective rolling radius of the tire 57. In one form of the preferred embodiment, the processor 105 includes a Comptrol Inc. "Intelligent Meter," Model No. IMC 85-910. The processor 105 also includes a microprocessor 113 (FIG. 6) and a built-in, alpha-numeric display 115.

Figure 7:
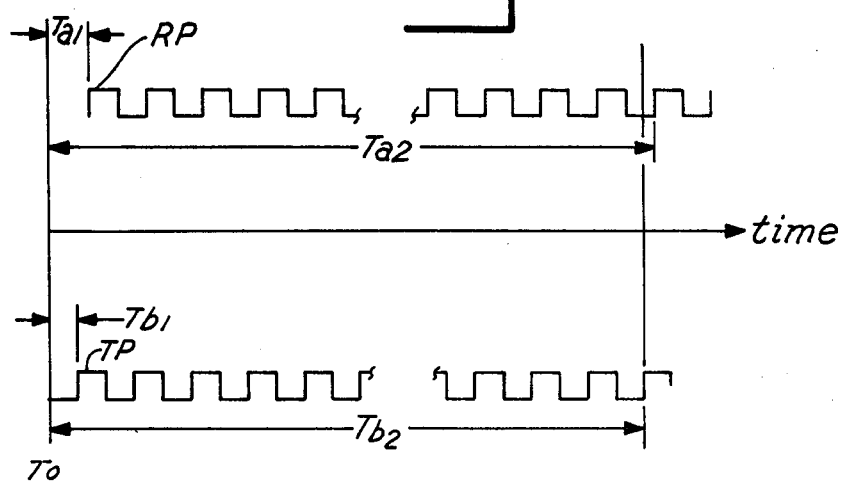
FIG. 7 is a graph illustrating the interaction between a first detector, a second detector, and a processor in a preferred form of the present invention.

The microprocessor 113 (FIG. 6) has an internal clock (not shown). After the tire 57 and rolling load drum 87 are both rotating at full speed, the processor 105 begins counting with its internal clock. As shown in FIG. 7, this time is described as $T_0$. At the next leading edge of a series of "tire pulses" (TP) the microprocessor 113 notes the time that has elapsed ($T_{b1}$) and thereafter begins to accumulate the total number of "tire pulses" ($N_b$). After the time, $T_{b1}$, the microprocessor 113 also notes the time ($T_{a1}$) that elapses until the leading edge of the next "rolling load pulse" (RP). The microprocessor 113 then begins to accumulate the total number of "rolling load pulses" ($N_a$).

After 2,800 "tire pulses" have been received (and the tire 57 has revolved four times) the microprocessor 113 stores the corresponding time ($T_{b2}$) and stops counting "tire pulses." The microprocessor 113 then stores the time ($T_{a2}$) corresponding to the next leading edge of the "rolling load pulse" which occurs after the time, $T_{b2}$.

The microprocessor 113 then subtracts $T_{b1}$ from $T_{b2}$, in order to determine a time, $T_b$, and substracts $T_{a1}$ from $T_{a2}$, in order to determine a time, $T_a$. The pulses produced by the photosensitive detector 97 and the pulse doubler circuitry 111 may be out of phase. Thus, the ratio of the number of pulses received from each ($N_a/N_b$) must be corrected by the ratio of the total time duration ($T_b/T_a$) in order to provide a more accurate ratio of the number of revolutions of the rolling load drum 87 to the revolutions of the tire 57.

According to a preferred embodiment, which requires a low number of tire revolutions (thereby saving time), the microprocessor 113 carries out the following algorithm:

$$\text{Effective Rolling Radius} = \frac{(N_a)(T_b)}{(N_b)(T_a)} \times R_1$$

where
$N_a$ = Number of "Rolling Load Pulses" counted;
$T_a$ = Time period for $N_a$;

$N_b$ = Number of "Tire Pulses" counted;
$T_b$ = Time period for $N_b$; and
$R_1$ = Radius of the Rolling Load Drum.

The effective rolling radius is thus determined by comparing how many times the circular, rolling load drum 87 had to revolve in order to roll the same distance as the tire 57, which revolved under a load. Thus, the effective rolling circumference is compared with the known circumference of the rolling load drum 87 and then multiplied by the known radius of the rolling load drum 87.

The pulses produced by the photosensitive detector 97 and pulse doubler circuitry 111 may be out of phase and of unequal duration. These factors may introduce an error in the measurement of the effective rolling radius. In order to reduce such measurement error, the tire 57 is allowed to rotate four times and produce 2880 tire pulses.

A number of different microprocessors will operate in the present invention. A preferred form of the present invention, however, uses an Intel Semiconductor Microprocessor, Model No. 8085A.

As shown in FIG. 6, the display 115 in the processor 105 includes a keyboard 117 that an operator of the measuring device 55 may activate. In response, the microprocessor 113 will calculate, and the display 115 will show, either (1) the effective rolling radius of the tire, (2) the effective rolling diameter of the tire; or (3) the ratio (ERR/R) between the effective rolling radius of the tire and the radius of the rolling load drum. In addition, an operator may activate the keyboard 117 to program, or record, a new value in the microprocessor 113 for the radius of the rolling load drum.

When appropriately requested by the keyboard 117, the display 115 will also show the pulse rate of the first or second speed signals or will show a constant that represents the radius of the rolling load drum 87. If the operator has requested a test to be performed and the microprocessor 113 senses that the test device is malfunctioning, an error code will be displayed so as to help the operator locate the trouble.

The measuring device 55 also has the feature of being able to receive pulses from an external trigger (not shown) rather than the photosensitive detector 97 or revolution detector 99 (FIG. 6). In this way, the performance of the measuring device 55 may be checked when pulses of a known, test frequency are applied.

The microprocessor 113 stores its program on two 2K work PROM chips (not shown). In addition, a 1K word CMOS RAM with a battery backup (not shown) is used for variable storage. The microprocessor 113 is connected, via an asynchronous serial interface, to a 1000L computer (not shown).

The 1000L computer scans the keyboard 117 at a rate of 32 Hz. When the keyboard 117 is activated, the 1000L computer receives an appropriate signal and transmits a data request to the microprocessor 113. The microprocessor then determines a correct response and transmits it to the 1000L computer. The 1000L computer, in turn, ensures that a proper message is shown on the display 115. The display 115 is updated, or re-brightened, at a rate of 4 Hz.

In order to obtain appropriate data, perform the necessary calculations, and display the requested results, the microprocessor 113 steps through a sequence of program commands. An overview of this program is shown in FIG. 8; a more detailed flowchart for the program is shown in FIG. 9.

OVERVIEW OF THE MICROPROCESSOR PROGRAM

I.

Figure 8:
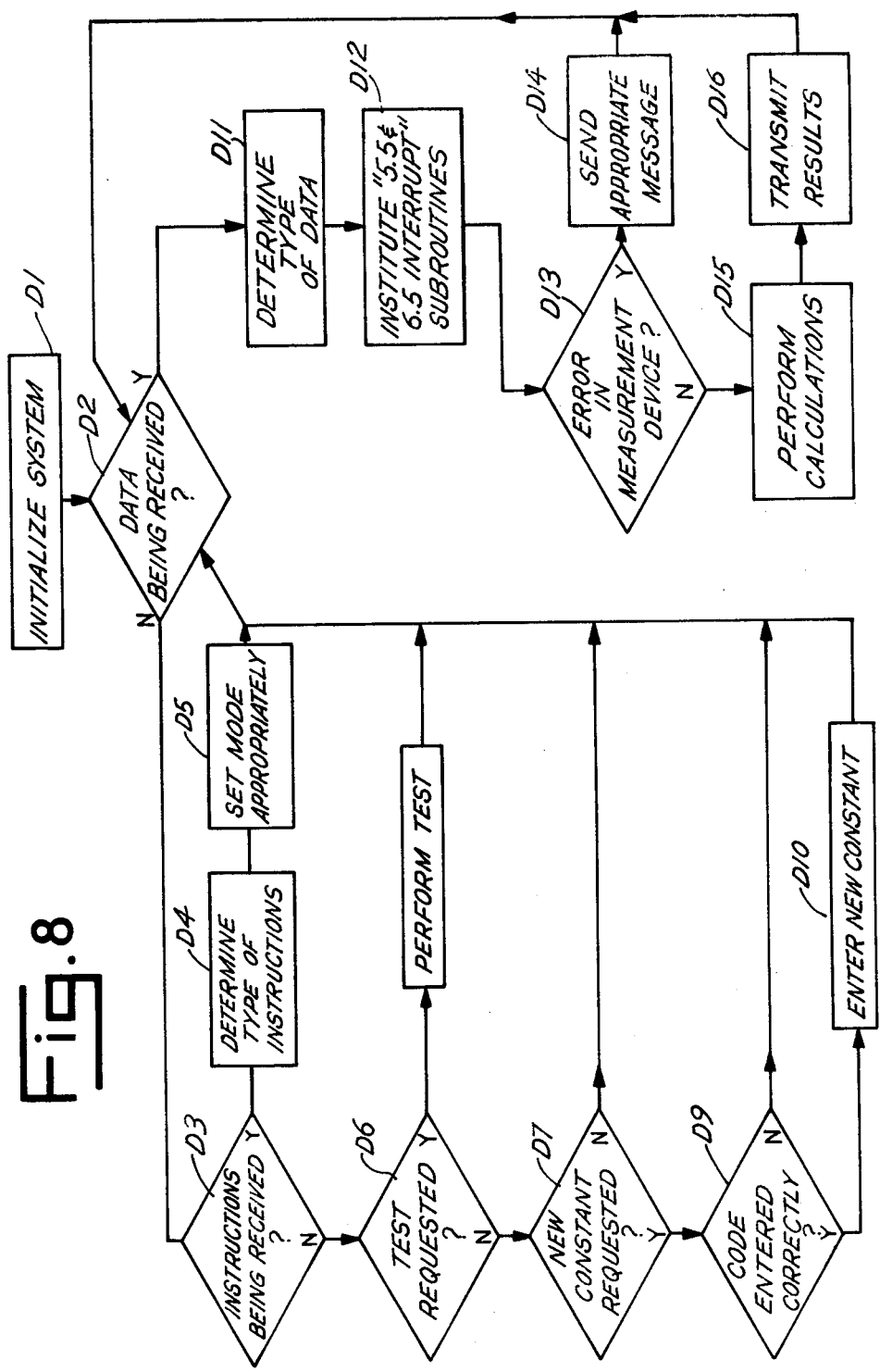
FIG. 8 is a short flowchart showing an overview of the program under which the microprocessor of the present invention operates.

As shown in FIG. 8, the system is initialized and put in a condition to run in step D1. Next, in step D2, the microprocessor 113 makes the major inquiry of whether it is receiving data such as the first and second speed signals.

II.

If the microprocessor 113 is not receiving such data, it inquires in step D3 whether it is receiving commands from the operator via the 1000L computer. If instructions are inputed, such as "determine and display an effective rolling radius," the microprocessor 113 recognizes this and readies itself to perform the calculations in steps D4-D5. Otherwise, the microprocessor 113 determines, in steps D6-D7, whether the operator has requested the performance of a test or indicated an intention to enter a new value for the diameter of the rolling load drum 87. A test of the device's operations is performed at step D8. A new value for the diameter of the rolling load drum 87 is entered in steps D9-D10, but only if the operator first inputs a proper "code."

III.

When the microprocessor 113 does receive information, it determines the type of data in step D11 and institutes the "5.5 and 6.5 interrupt" subroutines in step D12. The subroutines count, respectively, the first and second speed signals; they only become operable when the microprocessor 113 arrives at steps D11-D12. If the count of the first and second speed signals seems incorrect, the microprocessor 113 will initiate the display of an error message in steps D13-D14. Otherwise, the computation asked for (effective rolling radius, effective rolling circumference, etc.) is performed and the results are transmitted to the 1000L computer in steps D15-D16.

DESCRIPTION OF THE DETAILED FLOWCHART

Initialization

Figure 9A:
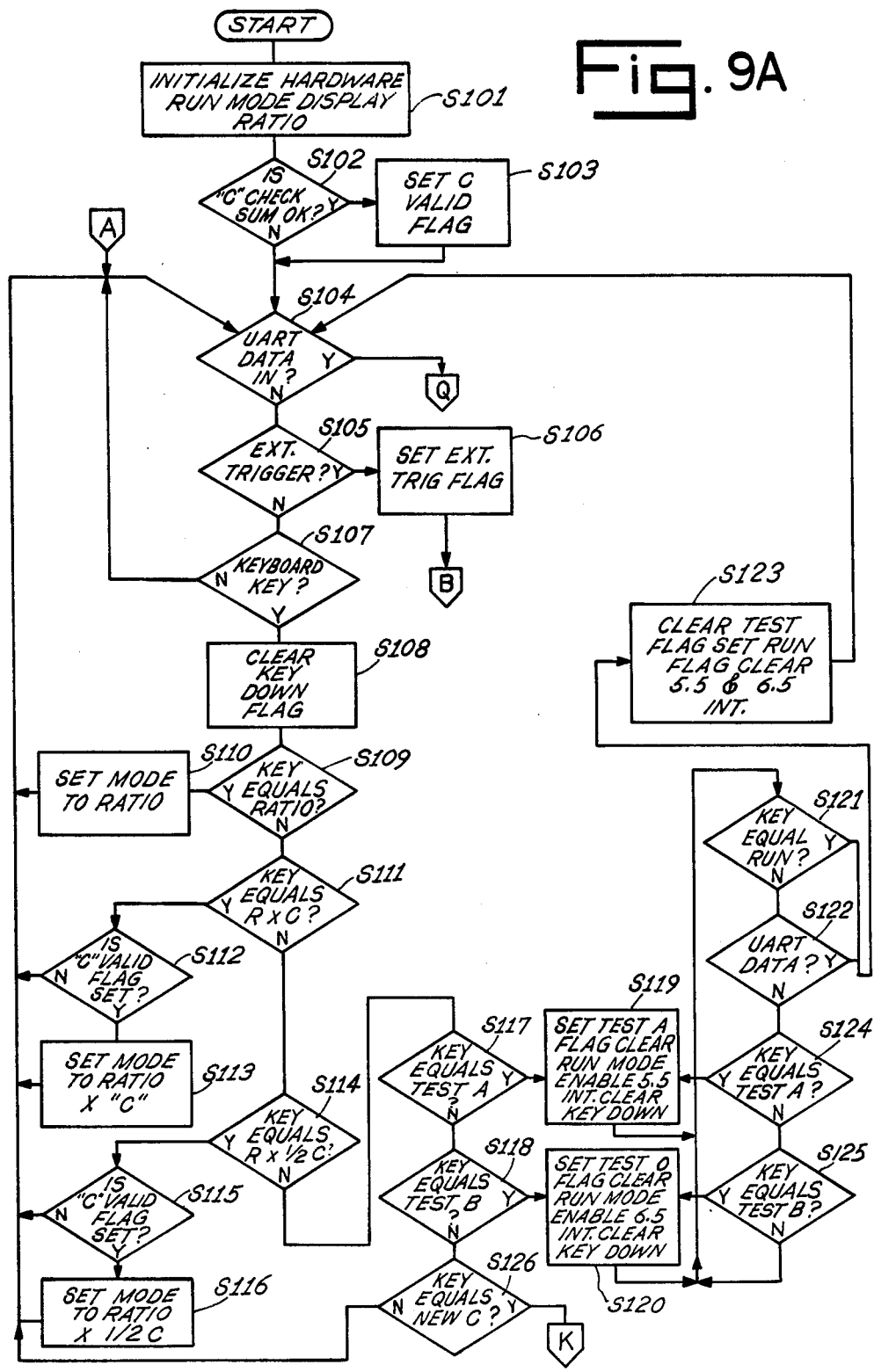
FIG. 9 is a detailed flowchart illustrating the program under which the microprocessor of the present invention operates.
Figure 9B:
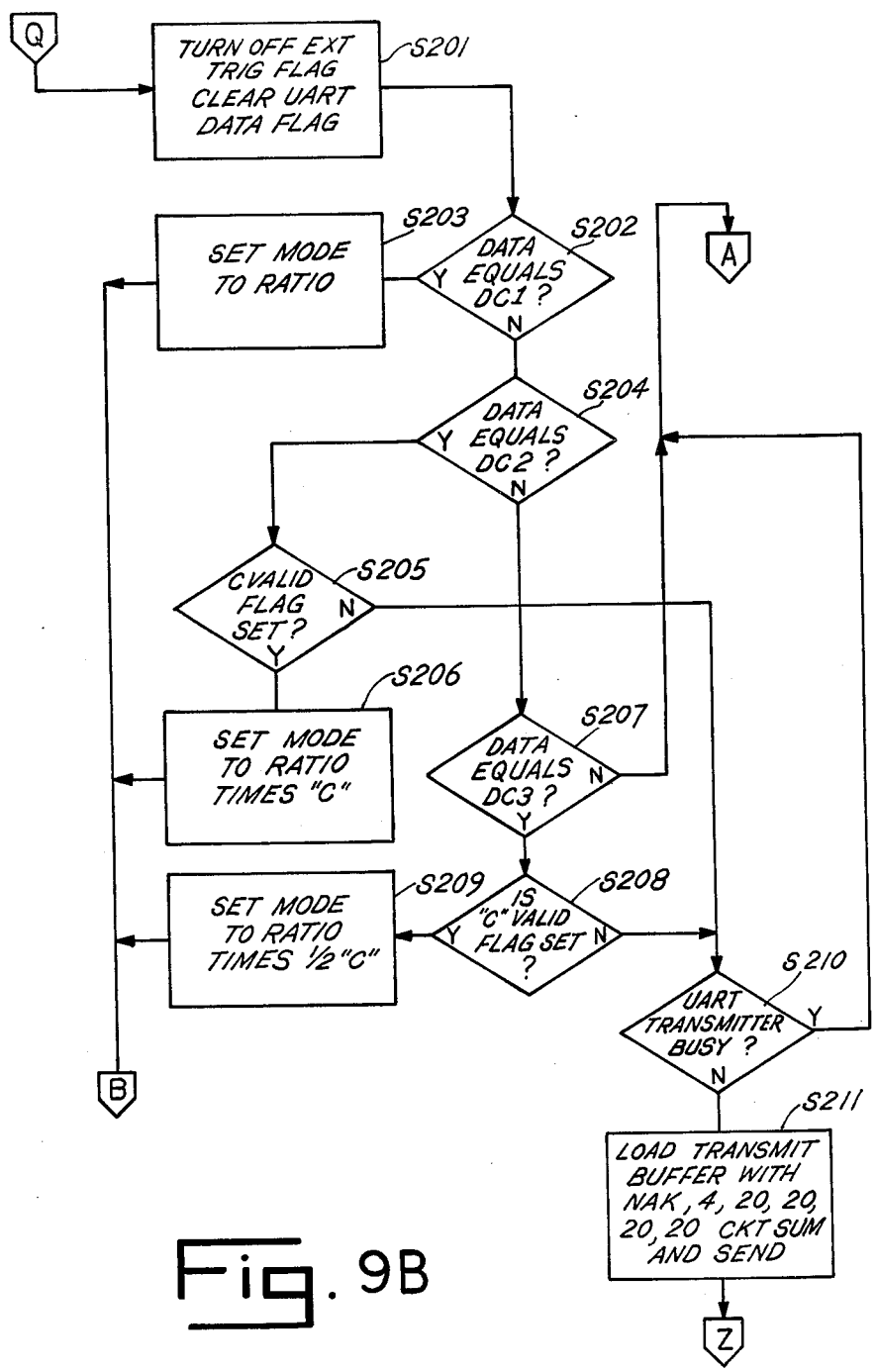

As shown in the more detailed schematic of FIG. 9A, an input is received from the 1000L computer in step S101. This indicates that the microprocessor 113 is to begin performing. The microprocessor 113 thus insures that it is in the "run" mode—i.e., that it is ready to receive measurement inputs and perform calculations.

The microprocessor 113 holds a constant, C, in memory that represents the diameter of the rolling load drum 87. In step S102, the microprocessor 113 insures that C has been properly "remembered" and, if so, sets an appropriate "flag," or "internal notation," in step S103.

Data Inquiry

In step S104, the microprocessor 113 inquires whether its Universal Asynchronous Receiver Transmitter (UART) is receiving measurement data through normal means. If not, the microprocessor 113 asks, in step S105, if measurement data is being received by the UART from an external trigger—i.e., whether it is about to receive test signals from an external test device. If so, a light (not shown) turns on in step S106, and the microprocessor 113 begins to act as though it were receiving "real" measurement data from the photosensitive detector 97 and revolution detector 99.

Command Inquiry

If the external trigger has not been set, the microprocessor 113 asks, in step S107, whether the operator has pushed a button in the keyboard 117 and thus whether a keyboard "flag" has been set. If not, it begins repeating the inquiries at step S104 again. If the operator is inputing data, however, the microprocessor 113 notes this, eliminates the keyboard "flag" in step S108, and begins to ask what key has been pushed.

If an operator indicates that he wishes to display the ratio of (i) the circumference of the tire 57 to (ii) the circumference of the rolling load drum 87, the microprocessor 113 notes this in step S109 and sets itself to the "ratio mode" in step S110. If the key indicating that the operator wants to know the value of the effective rolling circumference of the tire 57 is depressed, the microprocessor 113 notes this at step S111 and, at step S112, determines whether the C valid flag was set at step S103. If the flag has not been set, the sequence of data inquiries begins again at step S104. Otherwise, the microprocessor 113 sets the mode to Ratio x C at step S113 before going back to step S104 and inquiring whether measurement data is being received. If neither the Ratio or R x C key was pushed, the microprocessor 113 asks, at step S114, if the effective rolling radius key was depressed. If so, in steps S115–S116, a check for the valid C flag is made, and the mode is set to Ratio x ½ C.

If none of the "key down" questions were yet answered affirmatively, the microprocessor 113 asks itself, in steps S117–S118, whether the A or B test keys have been pushed. If the A test has been chosen, an A test flag is set in step S119. The microprocessor 113 is then taken from the run mode to the test mode, and the "5.5 interrupt" is unmasked, or allowed to operate. Thus, the microprocessor 113 will devote its resources to performing the steps in the "5.5 interrupt" subroutine unless a command having a higher priority is requested. The "5.5 interrupt" subroutine is shown in FIG. 9D and is discussed in a later section.

Similarly, in step S120, if the B test has been requested, a B test flag is set, the microprocessor 113 goes into the test rather than run mode, and the 6.5 interrupt subroutine is enabled. The 6.5 interrupt then takes priority over any lower priority subroutine, such as the 5.5 interrupt. The 6.5 interrupt subroutine is shown in FIG. 9E and is also discussed in a later section.

After the A or B test has been performed, the microprocessor 113 determines, in steps S121 and S122, whether the run key has been pushed or the UART is receiving other data. If so, the test flag is cleared in step S123. The run flag is then set and the 5.5 and 6.5 interrupt subroutines are cleared. Otherwise, if the A or B test keys are still depressed, the microprocessor 113 goes back, in steps S124–S125, to re-perform the appropriate test.

If neither the A test or B test button has been depressed, the microprocessor 113 inquires in step S126 whether the operator has indicated that a new constant is to be entered into memory. If so, the system is readied to receive a new constant in memory. This procedure is illustrated in FIG. 9G and discussed in a later section.

Determination of Data Type

When the UART does start to receive data, it is noted at step S201. See FIG. 9B. Any "flag" representing that the external trigger is functioning or that the UART is receiving data is then cleared. In steps S202–S209, the microprocessor 113 determines what type of data it is receiving. If the data is of a first type, entitled "DC1," the microprocessor 113 sets the mode to "Ratio" in step S203. If the data is of the second type, entitled "DC2," the microprocessor 113 checks to see that the valid C flag has been set and then sets the mode to Ratio x C. Similarly, if a third type of data, "DC3," is received, a check is made for a valid C flag and, if appropriate, the mode is set to Ratio x ½ C.

In the determination of whether the data is of the type DC2 or DC3, if a valid C has not been set (in step S103), the microprocessor 113 checks, in step S210, to see whether the UART is presently capable of transmitting a message. If so, the transmitter buffer, or memory, is loaded with a NAK ("not acknowledged") signal in step S211, and this message is sent to the 1000L computer. The 1000L ensures that an error message denoting the lack of a valid C is displayed.

Counting

Figure 9C:
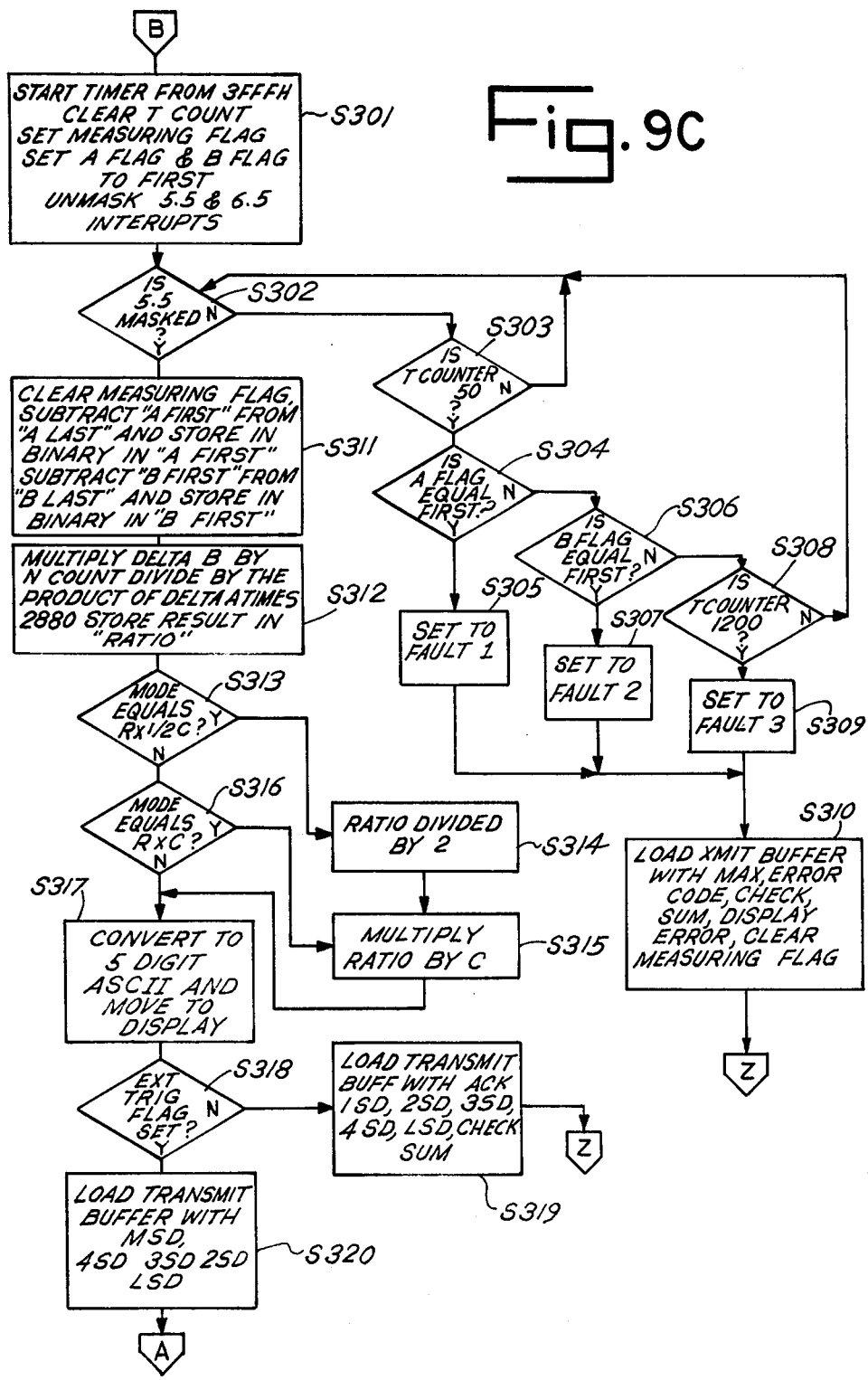
Figure 9D:
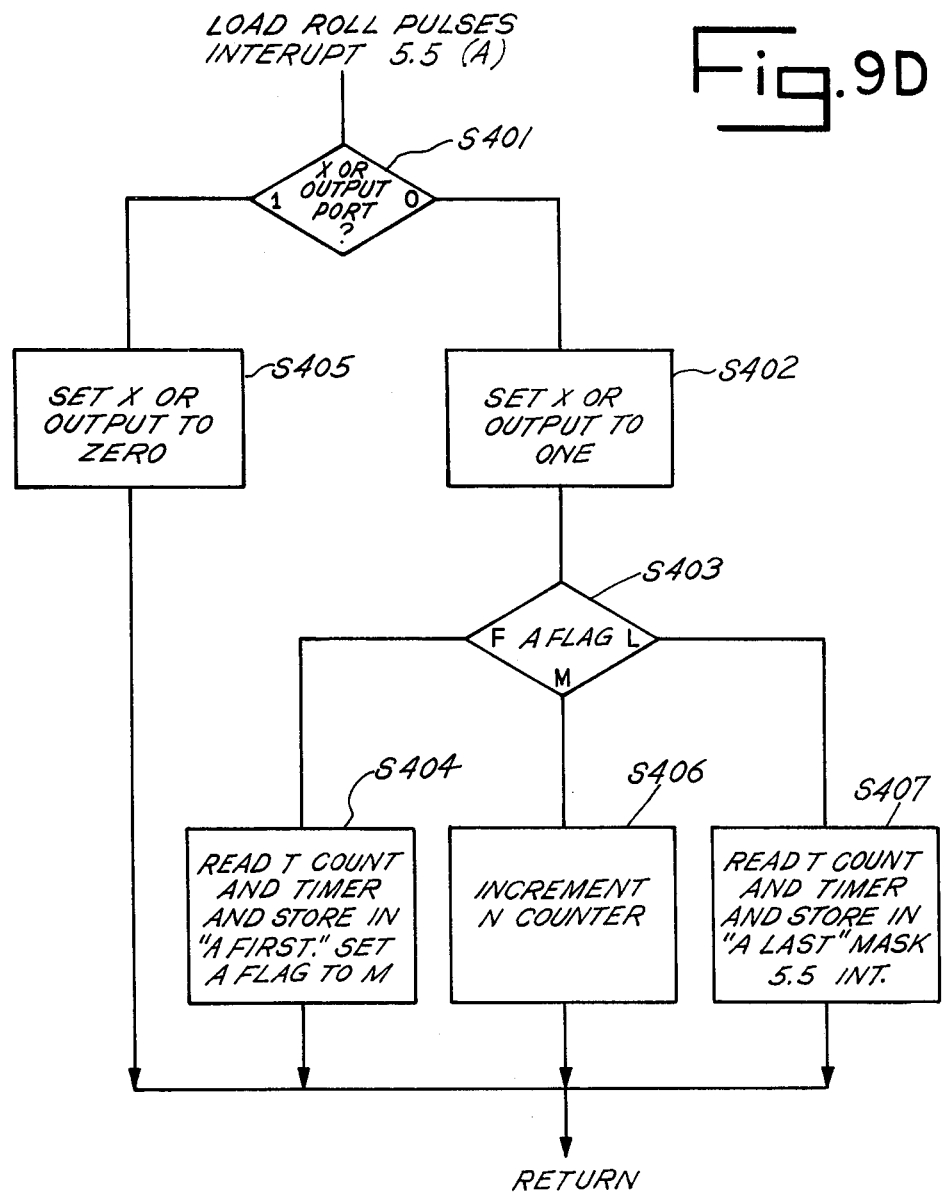
Figure 9E:
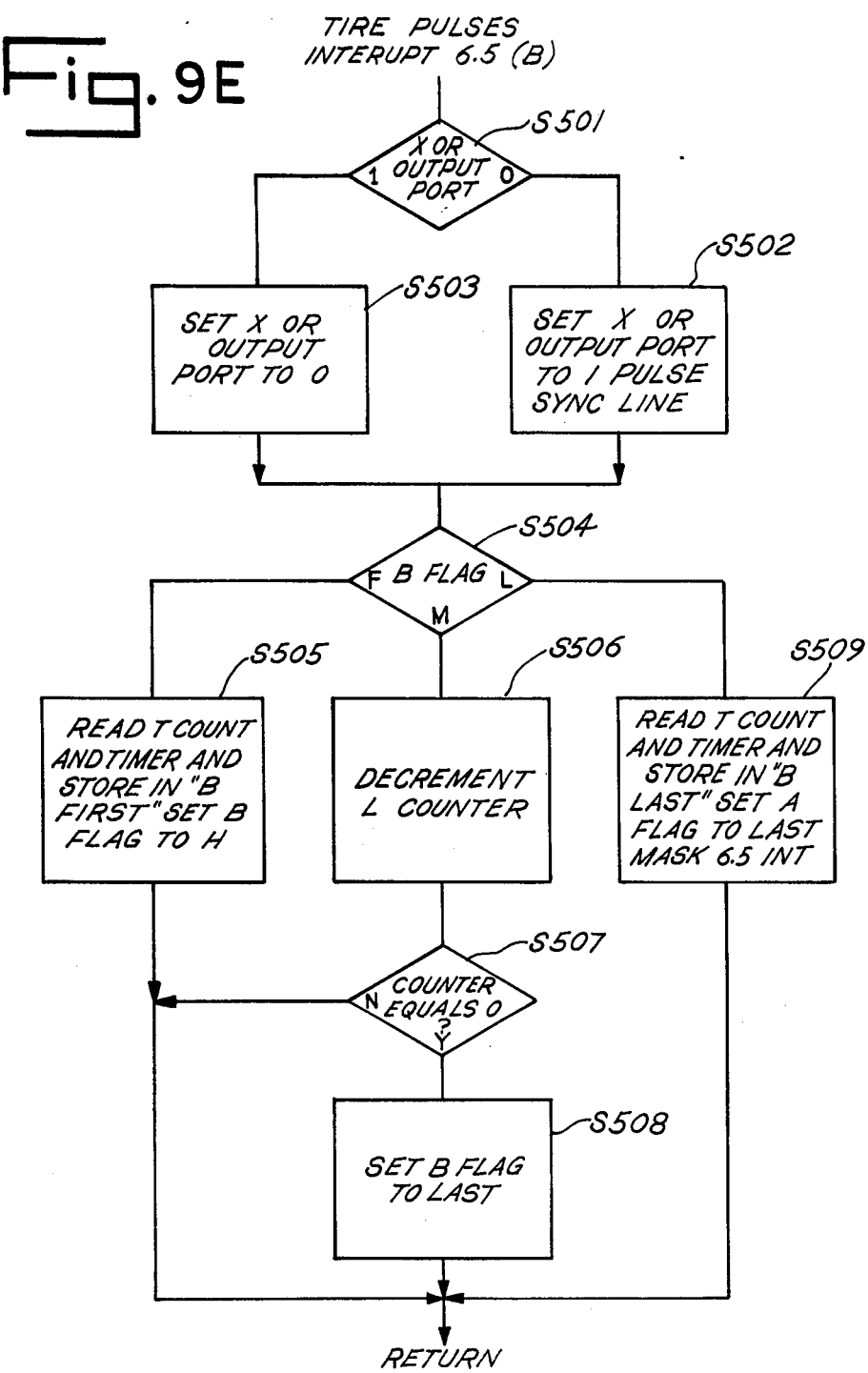
Figure 9F:
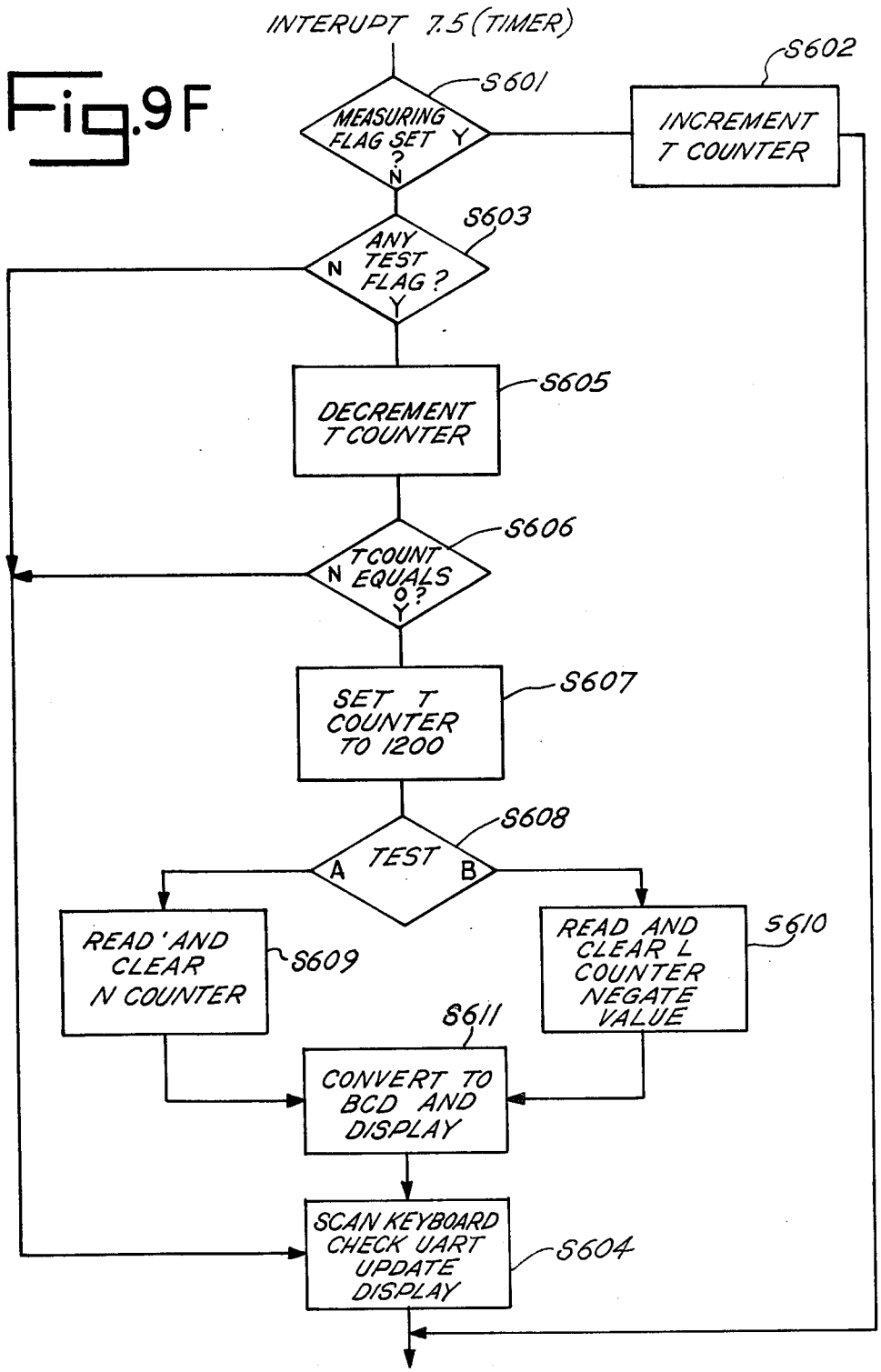
Figure 9G:
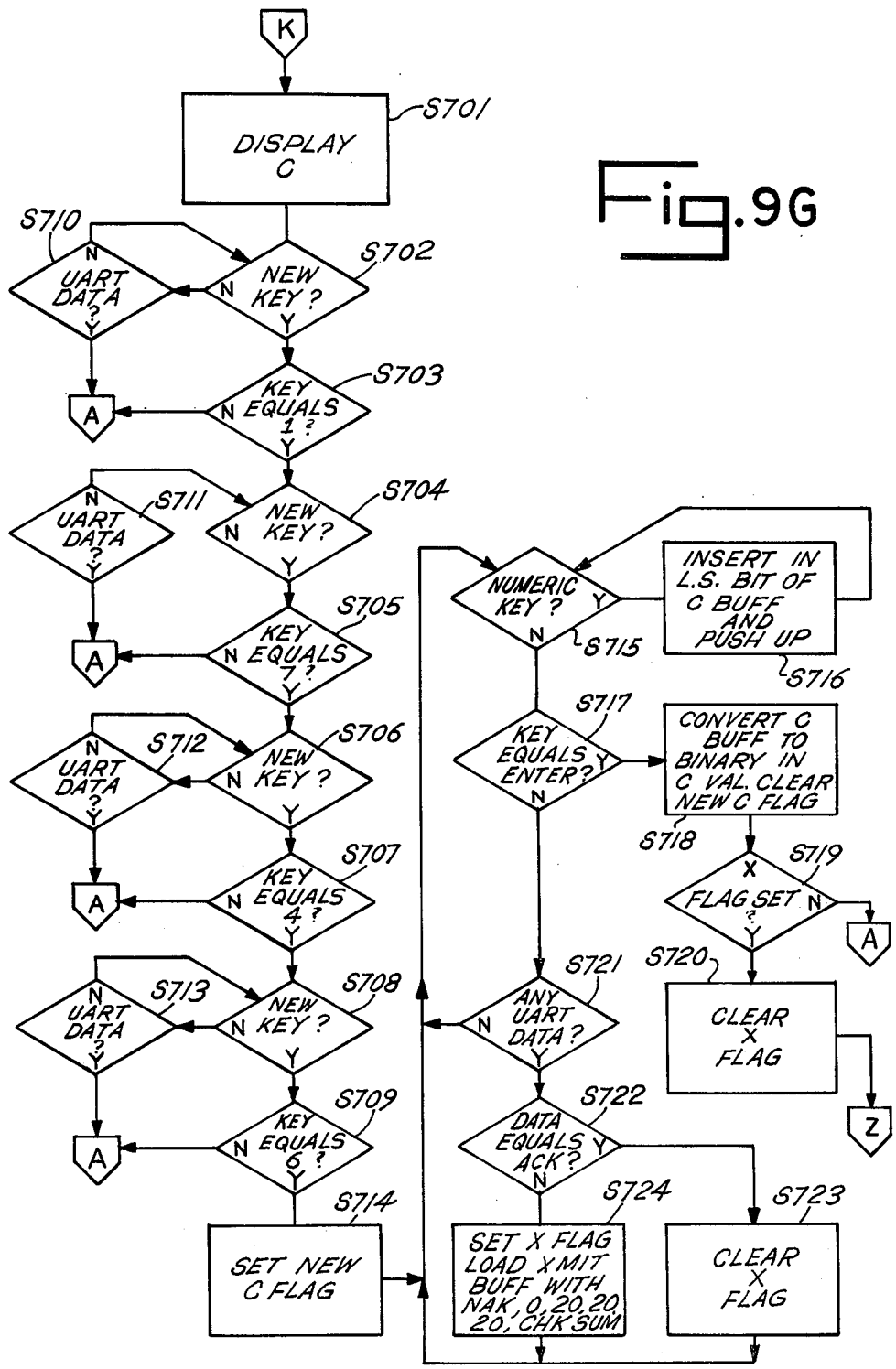

If it is determined that a calculation should be made by the microprocessor 113, the subroutine shown in FIG. 9C is used. At step S301 the timer is set to its maximum number; in one form of the preferred embodiment, the timer uses a hexidecimal number system and "3FFFH" represents the largest storable number. Also in step S301, the "T counter," which measures units of time, is set to zero. The operation of the T counter is shown in FIG. 9F and explained in a later section. Finally in step S301, the A and B flags are "set to first" and the 5.5 and 6.5 interrupts are "unmasked," or allowed to operate.

In step S302, the microprocessor 113 asks if the 5.5 interrupt has been masked yet. If not, it asks, at step S303, whether sufficient time has elapsed for the T counter to reach 50. If not, the microprocessor 113 goes back to step 301. Otherwise, in steps S303–S309, the microprocessor 113 determines why the 5.5 interrupt has not been masked, even though the T counter would have had sufficient time to reach 50 under normal conditions. (As will be shown later, if the 5.5 interrupt has been masked, the 6.5 interrupt is necessarily in a similar state.)

If the A flag still equals one, it means that no rolling load pulses are being received from the photosensitive detector 97. The microprocessor 113 determines this and sets an appropriate "fault 1" message flag. If the B flag still is one, it means that the tire pulses are not being received from the tachometer 109, and the "fault 2" flag is set. If the T counter equals 1200, it has not been decremented properly—i.e., the timer is malfunctioning. An appropriate "fault 3" flag is then set.

If any of the three fault flags have been set, the transmitter buffer is loaded with an ACK ("acknowledged") signal and the correct error code at step S310. The message is then sent to 1000L computer for presentation on the display 117.

Computation

In step S311, the measuring flag is cleared after all tire and load roll pulses have been "counted" by the microprocessor 113 (FIG. 9C). The value ascribed to the last A, or load roll, pulse is subtracted from the value of the first "A" pulse, and the result is stored in a memory file entitled "A First." Similarly, the value of the last B, or tire, pulse is subtracted from the value of the first B pulse and stored as "B First."

In step S312, the value of "B first" is multiplied by the value of the N counter. The resulting value is then divided by the quantity of A First times 2880. The result of this calculation is stored in a file entitled Ratio.

If the microprocessor 113 was put in the R x ½ C mode (at step S209), this is "remembered" at step S313, and the value of the Ratio file is multiplied by ½ C in steps S314–S315. If the mode was set at R x C (in step S206), this is determined, and the value of the Ratio file is multiplied by C in steps S315 and S316. Otherwise, the Ratio file remains unaffected.

In step S317, the value of the Ratio file is converted to the language, American Standard Code for Information Interchange (ASCII). In steps S318–S320, the microprocessor 113 determines whether the external trigger flag has been set (in step S106) and then loads the ASCII number into the transmitter buffer for transmission to the 1000L computer.

5.5. Interrupt

When the 5.5 interrupt is unmasked at step S301, the microprocessor 113 begins to step through the subroutine shown in FIG. 9D. Pulses emitted by the photosensitive detector 97 are directed to a first input of an exclusive OR gate (not shown); the output of the exclusive OR gate is sensed by the microprocessor 113 at step S401.

Initially, an "A flag" is set to "F," indicating that no pulses have yet been received since the 5.5 interrupt was unmasked. The first input to the exclusive OR gate (which originates in the photosensitive detector 97) is LOW; a second input to the exclusive OR is kept HIGH by the microprocessor 113, and the output of exclusive OR is thus kept in a HIGH state.

At the leading edge of the first pulse from the photosensitive detector 97, the exclusive OR receives two HIGH inputs, making the output of the exclusive OR LOW. The microprocessor 113 senses this, and, at step S402, adjusts the second input such that the output of the exclusive OR is in a HIGH state.

At step S403, the A flag is read. On the leading edge of the first pulse, the content of the T (time) counter is recorded, at step S404, and stored in a file entitled "A first." The A flag is then changed to an "M" (for "middle"), and the microprocessor 113 waits to receive the trailing edge of a pulse from the photosensitive detector 97. When this occurs, the microprocessor 113 progresses to step S405, where the output of the exclusive OR gate is set back to a LOW state. Thus, when the next leading edge of a pulse from the photosensitive detector 97 occurs, the microprocessor 113 puts the output of the exclusive OR back to a HIGH state (in step S402) and increments N (number of load roll pulses) by one (in step S406).

The process described above continues until the A flag is set to L (for "last") in the 6.5 interrupt subroutine. After this occurs, the microprocessor 113 moves to step S407 at the next leading edge of a pulse from the photosensitive detector 97. The value of the T counter is read and stored in a file entitled "A Last," and the 5.5 interrupt masks itself.

6.5 Interrupt

The 6.5 interrupt subroutine is shown in FIG. 9E. As with the 5.5 interrupt, the 6.5 interrupt is unmasked at step S201. The output of the tachometer 109 is connected with an exclusive OR gate. The output of this gate provides an input to the microprocessor 113. As with the A flag, the B flag is initially set at a ZERO state. In addition, a "L counter" is set to a value of 2879.

At steps S501–S503, the microprocessor 113 emits a relatively long, microsecond pulse to the 1000L computer at each leading edge of the tire pulse. This "synchronization pulse" ensures that the microprocessor 113 and 1000L computer can accurately communicate with each other. Both the leading and trailing edges cause the microprocessor 113 to progress to step S504, where the B flag is read.

If the B flag is set at F, i.e., the "first" pulse is occurring, the microprocessor 113 moves to step S505, and the values of the "T counter" is read and stored in a file entitled "B First." The B flag is then set to an "M," or "middle," state.

For all subsequent leading and trailing edges of pulses from the tachometer 109, the microprocessor 113 moves to steps S506–S507. The L counter is decremented by one for each pulse. When it finally reaches zero, the B flag is changed to "L" or "last," at step S508.

The following pulse then causes the microprocessor 113 to move to step S509. The value of the T counter is read and stored in a file entitled "B last." The A flag is also set to last, so that at the next leading pulse from the photosensitive detector 97, the 5.5 interrupt subroutine will mask itself. The 6.5 interrupt subroutine is then masked.

Timer

The microprocessor 113 includes an internal, 3.072 megahertz clock (not shown). A "timer" for the microprocessor 113 operates in conjunction with the clock. As shown in FIG. 9F, the timer is given a 7.5 priority and runs continuously after the system is initialized in step S101 (FIG. 9A). If a measuring flag has been set in step S301 (FIG. 9C), the microprocessor 113 notes this at step S601 (FIG. 9F). The T counter is then incremented by 1 at step S602, and the inquiry regarding the measuring flag is repeated.

If a test flag has not been set at steps S119 or S120, the microprocessor 113 notes this at step S603 and, at step S604, checks whether the operator has input new commands at the keyboard or the UART is receiving data. Finally, it sends another pulse to "refresh" any message shown on the display before going back to step S601.

If a test flag has been set, the microprocessor 113 cycles through steps S605–S606. After the N and L counters are read, the T counter is decremented until it reaches a 0 value. At that point, the microprocessor 113 sets the T counter to 1200 and determines, in steps S607–S608, which test has been requested.

If an A, or rolling load pulse, test has been requested, the N counter, which increments from 0, is read and stored in step S609. If a B, or tire pulse, test is requested, the L counter, which decrements from 2879, is read and stored in step S610. The value of the L counter is then subtracted from 2879 to achieve a correct, understandable value for the number of tire pulses that have occurred. The values taken from the counters are then converted to Binary Coded Decimal (BCD) form in step S611 and transmitted to the 1000L computer for illustration on the display.

New Constant

The process for entering a new constant for the radius of the rolling load wheel is shown in FIG. 9G. After an operator indicates, at step S126, that a new constant is to be entered, the current C is shown on the display at step S701. The microprocessor 113 then sees if the proper code sequence (1-7-4-6) is entered in steps S702–S709. If the operator incorrectly enters the code or the UART starts receiving other data, such as from the photosensitive detector 97 or tachometer 109, the microprocessor 113 automatically aborts the attempt to program in a new C in steps S710-S713 and returns to step S104. If, however, the proper code is first entered and the UART does not receive other data, a new C flag is set at step S714. The microprocessor then accepts numeric inputs in steps S715-S716. Four digits are accepted as the radius of the load roll wheel, in inches. If the operator then pushes an enter key, the new value for C is converted to a binary number, stored in memory, and the new C flag is cleared.

If a transmit flag has not been set, the microprocessor 113 begins its data inquiry again at step S104. Otherwise, the transmit flag is cleared at step S720 and the microprocessor 113 waits for an acknowledgement that the value of the newly programmed C has been properly received.

If the microprocessor 113 does not receive an enter message in step S717, it may, instead, be receiving data through the UART. If so, the data is either acknowledged or not acknowledged by the microprocessor 113 in steps S721-S724. The microprocessor 113 will then again stand ready to receive the new value for C.

Acknowledgment of Transmission

After data has been sent by the microprocessor 113 to the 1000L computer (at steps S211, S310, S319 or S720), the UART is ready to receive an acknowledgment that the data was correctly received. Under such circumstances, a "data ready" flag is set.

Figure 9H:
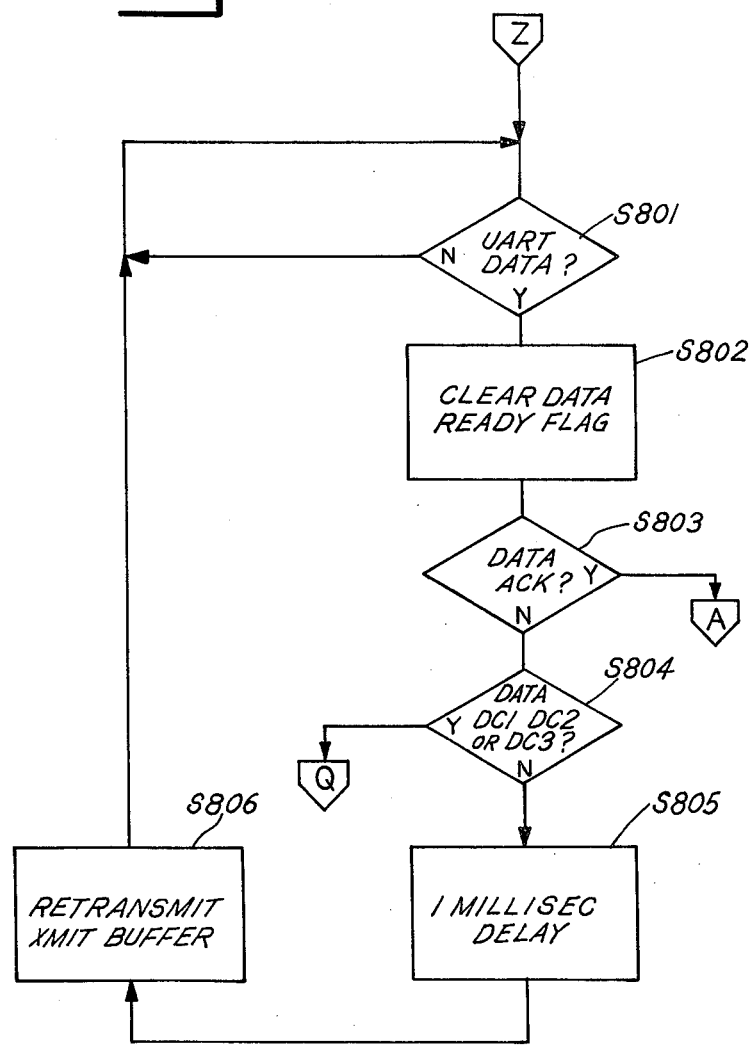

As shown in FIG. 9H, if the UART does receive data, the microprocessor 113 recognizes this in step S801. The data ready flag is then cleared in step S802. In step S803, if the data received is an ACK, the microprocessor 113 goes back to step S104 and the data-type inquiry. If the data indicates that a measurement is being performed, the microprocessor 113 moves from step S804 to step S201 and begins counting. If the data is neither an ACK or measurement data, the microprocessor 113 waits one millisecond and retransmits the contents of the transmitter buffer in steps S805-S806.

Although the foregoing description of the preferred embodiment will enable a person of ordinary skill in the art to make and use the same, the following detailed assembly language listing for the microprocessor 113 is included. The assembly language listing provides detailed information concerning the programming and operation of the overall system. Additional detailed features of the system will become apparent to those skilled in the art from reviewing the program.

```
LINE            SOURCE STATEMENT

1   $MOD85 PAGEWIDTH(80) MACROFILE PAGELENGTH(88) DEBUG
  2   $TITLE (' GOODYEAR RATIO CALCULATOR ')
  3
  4
  5
  6
  7   ;THIS PROGRAM ACCEPTS 2 PULSE TRAINS FROM TACHOMETERS
  8   ;AND CALCULATES THE RATIO OF SPEEDS. EXTERNAL CONNEC
  9   ;-TIONS ARE DONE ON AN IMC85-217 TERMINAL BLOCK AS PER:
 10   ;
 11   ;
 12   ; TB1    7    OPTO PORT BIT 3
 13   ;        6    OPTO PORT BIT 2
 14   ;        5    OPTO PORT BIT 1
 15   ;        4    OPTO PORT BIT 0    = EXTERNAL TRIGGER INPUT
 16   ;        3    TACH B INVERTED INPUT  - DO NOT CONNECT
 17   ;        2    TACH B NONINVERTING INPUT
 18   ;        1    TACH A INVERTED INPUT  - DO NOT CONNECT
 19   ;        0    TACH A NONINVERTING INPUT
 20   ;
 21   ; TB2    7    U14 PORT B BIT 7   = X-OR INPUT FOR TACH A
 22   ;        6                    6
 23   ;        5                    5
 24   ;        4                    4
 25   ;        3                    3
 26   ;        2                    2
 27   ;        1                    1   = PULSE OUT FOR TACH B
 28   ;        0                    0   = X-OR INPUT FOR TACH B
 29   ;
 30   ; TB3  PINS CORRESPOND TO U14 PORT A
 31   ;
 32   ;GROUND AN OPTO INPUT TO ACTIVATE IT
 33   ;U14 PORT B IS TTL OUTPUT
 34   ;U14 PORT A IS OPEN COLLECTOR OUT
 35
 36   ;
 37   ;
 38   ;        *JUMPER CHANGES*
 39
 40   ; J61-J62    POWERS OPTO INPUT PORT
 41   ; J60-J59    POWERS KEYBOARD LEDS AND OPTOS
 42   ; J57-J54    TACH B INVERTING INPUT TO REFERENCE
 43   ; J56-J53    TACH A INVERTING INPUT TO REFERENCE
 44   ; J39-J36    TRAP X-OR INPUT TO +5
```

```
45 ;J37-J45    RST 7.5 TO TIMER 1 OUTPUT
46 ;J43-J28    RST 6.5 TO X-OR GATE OUTPUT
47 ;J27-U14 PIN 29   X-OR INPUT TO PB BIT 0
48 ;J33-J38    RST 5.5 TO X-OR GATE OUTPUT
49 ;J31-J44    X-OR INPUT TO PB BIT 7
50 ;J32-J34    X-OR INPUT TO TACH A
51 ;J21-J22-J26    TIE UNUSED CMOS INPUTS
52 ;U14 PIN 2-U15 PIN 3
53 ;
54 ;CHANGE 7438 (U22,U23) TO 7400
55 ;
56 ;
57 ;      *RS232 TO RS422 CONVERSION*
58 ;
59 ;CUT J16-J19
60 ;CUT J17-J20
61 ;INSTALL J15-J18
62 ;REPLACE 9636 (U8) WITH 9638
63 ;
64 ;TO PREVENT FLOATING OF SERIAL INPUT INSTALL
65 ;RESISTOR AT J55-J52
66 ;RESISTOR AT J58-J49
67 ;
68 ;IF TRANSMISSION PROBLEMS OCCUR CHANGE TO
69 ;REMOVE RESISTOR J58-J49
70 ;REMOVE RESISTOR J55-J52
71 ;INSTALL RESISTOR J55-J49
72 ;
73 ;
74 ;        DC1=CONTROL Q
75 ;        DC2=CONTROL S
76 ;        DC3=CONTROL T
77 ;        ACK=CONTROL F
78 ;        NAK=CONTROL U
79 ;
80 ;
81 ;
82 ;
83 ;IMC 85-310 SOFTWARE PACKAGE
84
85
86
87 ;BOARD INITIALIZATION:
88 ;        PORT    MODE    VALUE   TYPE      I/O PINS
89 ;        2701H   OUTPUT  0       TTL-OUT   31-38
90 ;        2702H   OUTPUT  0       TTL-OUT   41-48
91 ;        2703H   INPUT   -       INTERNL   51-54
92 ;        2601H   INPUT   -       OPTO-IN   3-10
93 ;        2602H   OUTPUT  0       TTL-OUT   21-28
94 ;        2603H   INPUT   -       OPTO-IN   11-18
95 ;
96 ;        U15TMR (TMR1) IS USED FOR ALL TIMING FNCTIONS
97 ;          INCLUDING BAUD RATE, KEYBOARD SCAN, AND
98 ;          DISPLAY UPDATE. THE SUBROUTINE 'BAUDRT' SETS
99 ;          THE TIMER AND THE SOFTWARE DIVISOR FOR
100;          KEYBOARD SCAN ACCORDING TO ONE OF FOUR BAUD
101;          BAUD RATES SPECIFIED BY THE FLAG 'BAUD'.
102;          STANDARD CONFIGURATION HAS U15TMR DRIVING THE
103;          RST7.5 INTERRUPT LINE.
104;        U14TMR (TMR2) IS UNINITIALIZED AND IS NOT USED.
105;
106;        CMOS RAM IS CHECKED FOR VALID CHECKSUM AT
107;          POWERUP. THE FLAG BYTE 'BAUD' TELLS THE CHKSM
108;          ROUTINE WHETHER THE RAM IS 256 OR 1024 BYTES
109;          LONG. IF THE CHECKSUM IS NOT VALID, THE SIZE OF
110;          THE RAM IS DETERMINED, THE RAM CLEARED, AND A
111;          NEW CHECKSUM IS COMPUTED.
112;
113;        NMOS RAM (512 BYTES) IS INITIALIZED AS FOLLOWS:
114;          BYTES 2200-222F ARE RESERVED FOR STACK
115;          BYTES 2230-2237 ARE ASCII DISPLAY BUFFER
116;          BYTES 2238-224B ARE FLAGS AND POINTERS
117;          BYTES 224C-23FF ARE NOT INITIALIZED
118;
119;GENERAL OPERATION:
120;        THE USER SHOULD APPEND HIS PROGRAM AT 'EXEC',
```

```
121 ;           LOCATION 2FC HEX.
122 ;           U15TMR (TMR1) RUNS ALL FUNCTIONS OF THIS PROGRAM
123 ;           SEE SECTION 2.E.3 OF THE INTELLIGENT METER USER
124 ;           MANUAL FOR DETAILS. U15TMR IS SET TO PROVIDE
125 ;           AN INTERRUPT RATE 3X THE DESIRED BAUD RATE FOR
126 ;           SOFTWARE UART. THIS INTERRUPT RATE IS DIVIDED
127 ;           IN SOFTWARE BY APPROPRIATE VALUE TO GENERATE A
128 ;           32 HZ KEYBOARD SCAN RATE, AND AGAIN BY 8 TO
129 ;           GENERATE THE 4 HZ DISPLAY UPDATE RATE.
130
131 ;DISPLAY SCAN OPERATION:
132 ;           THE DISPLAY BUFFER 'ASCBUF' (2230-2237) IS A
133 ;           MODIFIED ASCII FORMAT. BITS 0-5 ARE THE
134 ;           TRUNCATED ASCII CODE, BIT 6 ENABLES THE D.P.
135 ;           IF SET, AND BIT 7 FLASHES THE CHARACTER IF
136 ;           SET.
137 ;           AT A RATE OF APPROXIMATELY 4 HZ, THE SUBROUTINE
138 ;           'DSPLY' IS CALLED, WHICH TAKES THE 'ASCBUF'
139 ;           CHARACTERS, CONVERTS THEM TO 14 SEGMENT
140 ;           FORMAT, AND LOADS THEM INTO THE DISPLAY DRIVER
141 ;           CHIPS.
142 ;           TO DISPLAY INFORMATION, SIMPLY WRITE THE DATA TO
143 ;           THE 8 RAM LOCATIONS OF 'ASCBUF' AS IT IS TO
144 ;           APPEAR ON THE DISPLAY.
145
146 ;KEYBOARD SCAN OPERATION:
147 ;           THE KEYBOARD HAS 8 COLUMNS AND 4 ROWS. THE 8
148 ;           COLUMNS ARE SHARED WITH 8 LEDS ON THE KEYBOARD
149 ;           BEZEL. THESE LEDS CAN BE USER SET TO ANY STATE.
150 ;           KEYBOARD SCAN IS ACCOMPLISHED BY OUTPUTTING A
151 ;           COLUMN SCAN PATTERN, READ THE KEYBOARD ROWS AND
152 ;           RESTORE THE LED STATUS SO QUICKLY THAT IT IS
153 ;           IMPERCEPTIBLE. THE STATUS LEDS ARE CONTROLLED
154 ;           SETTING BITS IN RAM. BY SETTING BITS IN 'ALEDS'
155 ;           (223A) MAKES THE CORRESPONDING LED BE TURNED ON
156 ;           BY THE 'DSPLY' ROUTINE UNTIL THAT BIT IS RESET:
157 ;           BY SETTING BITS IN 'BLEDS' (223B) THE CORRESP.
158 ;           LEDS WILL BE TURNED ON FOR ONE DISPLAY SCAN
159 ;           INTERVAL (.25 SEC) AND 'BLEDS' WILL BE CLEARED.
160 ;           KEYBOARD ENTRY DATA IS AVAILABLE THROUGH MEMORY
161 ;           LOCATION 'KEYDAT' (223F). BITS 0-4 GIVE A HEX
162 ;           ONE OF 32 KEY ADDRESS, AND BIT 7 IS SET TO A 1
163 ;           WHEN NEW DATA IS AVAILABLE. USER SOFTWARE MUST
164 ;           CLEAR BIT 7 AFTER ACCEPTING DATA IN ORDER TO
165 ;           KNOW WHEN NEW DATA BECOMES AVAILABLE.
166
167 ;UART OPERATION:
168 ;           THE UART OPERATES BY SOFTWARE POLLING AT THE
169 ;           BAUD RATES OF 110, 300, 600, AND 1200. THE
170 ;           RECEIVER REQUIRES 1 START BIT, 7 DATA BITS,
171 ;           AND 1 STOP BIT. THE TRANSMITTER SENDS 1 START
172 ;           BIT, 7 DATA BITS, AND 1 STOP BIT (110 BAUD HAS
173 ;           2 STOP BITS)
174 ;           DATA TO BE TRANSMITTED SHOULD BE LOADED INTO
175 ;           'XMTDTB' (2243) WITH BIT 8 =0. WHEN BIT 8 IS
176 ;           SET TO A ONE, THE UART TRANSMITTER IS READY FOR
177 ;           A NEW DATA WORD.
178 ;           RECEIVE DATA IS ACCESSED THROUGH 'RCVDTB' (2248)
179 ;           WITH BIT 8 =0 MEANING THE RECEIVE DATA IS
180 ;           AVAILABLE AND BIT 8 =1 MEANING NO DATA IS
181 ;           AVAILABLE. THE USER ROUTINE MUST SET BIT 8 =1
182 ;           AFTER ACCEPTING DATA TO AVOID AN OE (OVERRUN
183 ;           ERROR) WHEN THE NEXT CHARACTER COMES IN.
184 ;           UART STATUS IS AVAILABLE THROUGH 'USTSTR' (2240)
185 ;           WHERE BIT 0 =OVERRUN ERROR AND BIT 1=FRAMING
186 ;           ERROR. BIT 8 OF 'USTSTR' IS USED FOR TEMP STOR-
187 ;           AGE OF RECEIVE BITS AND MUST NOT BE CHANGED.
188 ;           ERROR FLAGS ARE CLEARED BY WRITING A 0 TO
189 ;           THOSE BIT LOCATIONS.
190
191
```

```
LOC     OBJ             LINE            SOURCE STATEMENT
                        192     ;PROGRAM SYMBOL TABLE LISTING:
                        193
                        194     U14RAM  EQU     2200H
                        195     STCK    EQU     2230H
                        196     ASCBUF  EQU     2230H
                        197
                        198     ASCFG   EQU     2238H
                        199
                        200
                        201     LEDST   EQU     2239H
                        202     ALEDS   EQU     223AH
                        203     BLEDS   EQU     223BH
                        204     SCANCT  EQU     223CH
                        205     KYSHFT  EQU     223DH
                        206     KEYSAV  EQU     223EH
                        207     KEYDAT  EQU     223FH
                        208
                        209
                        210     USTSTR  EQU     224CH
                        211
                        212     XMTCT3  EQU     2241H
                        213     XMTCT   EQU     2242H
                        214     XMTDTB  EQU     2243H
                        215
                        216     XMTDTA  EQU     2244H
                        217     RCVCT3  EQU     2245H
                        218     RCVCT   EQU     2246H
                        219     RCVDTA  EQU     2247H
                        220     RCVDTB  EQU     2248H
                        221
                        222
                        223     SOFDV2  EQU     2249H
                        224     SOFDIV  EQU     224AH
                        225     DIV8    EQU     224BH
                        226             ;
                        227             ;
                        228     TEST    EQU     224EH
                        229     XMTBUF  EQU     224FH
                        230     XMTPTR  EQU     2257H
2258                    231     AFLAG   EQU     2258H
2259                    232     BFLAG   EQU     2259H
225A                    233     NCOUNT  EQU     225AH
225C                    234     LCOUNT  EQU     225CH
225E                    235     AFIRST  EQU     225EH
2264                    236     ALAST   EQU     2264H
226A                    237     BFIRST  EQU     226AH
2270                    238     BLAST   EQU     2270H
227C                    239     RATIO   EQU     227CH
227F                    240     TCOUNT  EQU     227FH
2281                    241     OLDTRG  EQU     2281H
                        242             ;
                        243             ;
                        244
2300                    245     U15RAM  EQU     2300H
2700                    246     U14CTL  EQU     2700H
2701                    247     U14PA   EQU     2701H
2702                    248     U14PB   EQU     2702H
2703                    249     U14PC   EQU     2703H
2704                    250     U14TMR  EQU     2704H
2600                    251     U15CTL  EQU     2600H
2601                    252     OPTOIN  EQU     2601H
2602                    253     KBDSCN  EQU     2602H
2603                    254     KBDINP  EQU     2603H
2604                    255     U15TMR  EQU     2604H
                        256
                        257
3800                    258     CMOS    EQU     3800H
3800                    259     CHKSM   EQU     3800H
3802                    260     BAUD    EQU     3802H
                        261
3803                    262     MEM     EQU     3803H
3804                    263     CBUFF   EQU     3804H
380A                    264     CVAL    EQU     380AH
2000                    265     DISPLY  EQU     2000H
```

; PROGRAM LISTING:

```
0000 F3          270  PWRUP:   DI
0001 3ED9        271           MVI  A,0D9H
0003 30          272           SIM
0004 313022      273           LXI  SP,STCK
0007 210027      274           LXI  H,U14CTL
000A 3603        275           MVI  M,3H
000C 25          276           DCR  H
000D 3602        277           MVI  M,2H
000F 212502      278           LXI  H,INIT1
0012 113022      279           LXI  D,ASCBUF
0015 012000      280           LXI  B,20H
0018 CD1603      281           CALL XFRDN
001B CDC801      282           CALL CHKSUM
001E C33F00      283           JMP  PWRUP2
0021 00          284           NOP
0022 00          285           NOP
0023 00          286           NOP
0024 F3          287  TRP:     DI
0025 CD2F03      288           CALL DLY100
0028 C30000      289           JMP  0
002B 00          290           NOP
002C C3D809      291  RS55:    JMP  RST55
002F 00          292           NOP
0030 00          293           NOP
0031 00          294           NOP
0032 00          295           NOP
0033 00          296           NOP
0034 C3250A      297  RS65:    JMP  RST65
0037 00          298           NOP
0038 00          299           NOP
0039 00          300           NOP
003A 00          301           NOP
003B 00          302           NOP
003C C35500      303  RS75:    JMP  RST75
                 304
003F 3E03        305  PWRUP2:  MVI  A,3
0041 320238      306           STA  BAUD
0044 CDF101      307           CALL BAUDRT
0047 3EC2        308           MVI  A,0C2H
0049 320026      309           STA  U15CTL
004C 3E00        310           MVI  A,00H
004E 325922      311           STA  BFLAG
0051 FB          312           EI
0052 C33F03      313           JMP  EXEC
                 314
0055 F3          315  RST75:   PUSH PSW
0056 E5          316           PUSH H
0057 D5          317           PUSH D
0058 C5          318           PUSH B
0059 3A4E22      319           LDA  TEST
005C E620        320           ANI  020H
005E CA6B00      321           JZ   RST75A
                 322
0061 2A7F22      323           LHLD TCOUNT
0064 23          324           INX  H
0065 227F22      325           SHLD TCOUNT
0068 C37201      326           JMP  RST75B
006B 3A4E22      327  RST75A:  LDA  TEST
006E E603        328           ANI  03H
0070 CAB100      329           JZ   RST75D
                 330
0073 2A7F22      331           LHLD TCOUNT
0076 2B          332           DCX  H
0077 7C          333           MOV  A,H
0078 B5          334           ORA  L
0079 227F22      335           SHLD TCOUNT
007C C2B100      336           JNZ  RST75D
007F 21100E      337           LXI  H,3600
0082 227F22      338           SHLD TCOUNT
                 339
0085 3A4E22      340           LDA  TEST
```

```
0088 E601          341            ANI  01H
008A CA9A00        342            JZ   RST75B
                   343
008D 2A5A22        344            LHLD NCOUNT
0090 EB            345            XCHG
0091 210000        346            LXI  H,0
0094 225A22        347            SHLD NCOUNT
0097 C3AB00        348            JMP  RST75C
009A 2A5C22        349   RST75B:  LHLD LCOUNT
009D 7D            350            MOV  A,L
009E 2F            351            CMA
009F 6F            352            MOV  L,A
00A0 7C            353            MOV  A,H
00A1 2F            354            CMA
00A2 67            355            MOV  H,A
00A3 23            356            INX  H
00A4 EB            357            XCHG
00A5 210000        358            LXI  H,0
00A8 225C22        359            SHLD LCOUNT
                   360
00AB EB            361   RST75C:  XCHG
00AC 3E00          362            MVI  A,0
00AE CDE508        363            CALL BCDCAN
                   364
00B1 3A4322        365   RST75D:  LDA  XMTDTB
00B4 87            366            ADD  A
00B5 D2CB00        367            JNC  RST75E
00B8 3A5722        368            LDA  XMTPTR
00BB FE56          369            CPI  LOW (XMTBUF+7)
00BD CACB00        370            JZ   RST75E
00C0 6F            371            MOV  L,A
00C1 2622          372            MVI  H,HIGH XMTBUF
00C3 3C            373            INR  A
00C4 325722        374            STA  XMTPTR
00C7 7E            375            MOV  A,M
00C8 324322        376            STA  XMTDTB
                   377   RST75E:
00CB 214022        378            LXI  H,USTSTR
00CE 7E            379            MOV  A,M
00CF 17            380            RAL
00D0 47            381            MOV  B,A
00D1 20            382            RIM
00D2 17            383            RAL
00D3 78            384            MOV  A,B
00D4 1F            385            RAR
00D5 77            386            MOV  M,A
00D6 23            387            INX  H
00D7 AF            388            XRA  A
00D8 B6            389            ORA  M
00D9 CAE000        390            JZ   RST751
00DC 35            391            DCR  M
00DD C30F01        392            JMP  RST753
00E0 23            393   RST751:  INX  H
00E1 AF            394            XRA  A
00E2 B6            395            ORA  M
00E3 CAF800        396            JZ   RST752
00E6 35            397            DCR  M
00E7 2B            398            DCX  H
00E8 3602          399            MVI  M,2
00EA 23            400            INX  H
00EB 23            401            INX  H
00EC 23            402            INX  H
00ED 37            403            STC
00EE 7E            404            MOV  A,M
00EF 1F            405            RAR
00F0 77            406            MOV  M,A
00F1 3E80          407            MVI  A,80H
00F3 1F            408            RAR
00F4 30            409            SIM
00F5 C30F01        410            JMP  RST753
00F8 23            411   RST752:  INX  H
00F9 7E            412            MOV  A,M
00FA 17            413            RAL
00FB DA0F01        414            JC   RST753
00FE 3E40          415            MVI  A,40H
0100 30            416            SIM
```

```
0101 2B          417           DCX  H
0102 2B          418           DCX  H
0103 3602        419           MVI  M,2
0105 23          420           INX  H
0106 3609        421           MVI  M,9
0108 23          422           INX  H
0109 7E          423           MOV  A,M
010A F680        424           ORI  80H
010C 77          425           MOV  M,A
010D 23          426           INX  H
010E 77          427           MOV  M,A
010F 214522      428  RST753:  LXI  H,RCVCT3
0112 AF          429           XRA  A
0113 B6          430           ORA  M
0114 CA1B01      431           JZ   RST754
0117 35          432           DCR  M
0118 C35801      433           JMP  RST756
011B 23          434  RST754:  INX  H
011C AF          435           XRA  A
011D B6          436           ORA  M
011E CA4C01      437           JZ   RST755
0121 23          438           INX  H
0122 3A4022      439           LDA  USTSTR
0125 17          440           RAL
0126 7E          441           MOV  A,M
0127 1F          442           RAR
0128 77          443           MOV  M,A
0129 2B          444           DCX  H
012A 2B          445           DCX  H
012B 3602        446           MVI  M,2
012D 23          447           INX  H
012E 35          448           DCR  M
012F C25801      449           JNZ  RST756
0132 23          450           INX  H
0133 7E          451           MOV  A,M
0134 17          452           RAL
0135 3F          453           CMC
0136 3E00        454           MVI  A,0
0138 17          455           RAL
0139 47          456           MOV  B,A
013A 23          457           INX  H
013B 7E          458           MOV  A,M
013C 17          459           RAL
013D 3F          460           CMC
013E 78          461           MOV  A,B
013F 17          462           RAL
0140 324022      463           STA  USTSTR
0143 2B          464           DCX  H
0144 7E          465           MOV  A,M
0145 E67F        466           ANI  7FH
0147 23          467           INX  H
0148 77          468           MOV  M,A
0149 C35801      469           JMP  RST756
014C 3A4022      470  RST755:  LDA  USTSTR
014F 17          471           RAL
0150 DA5801      472           JC   RST756
0153 3608        473           MVI  M,8
0155 2B          474           DCX  H
0156 3603        475           MVI  M,3
0158 214922      476  RST756:  LXI  H,SOFDV2
015B 35          477           DCR  M
015C 23          478           INX  H
015D C27201      479           JNZ  RST758
0160 7E          480           MOV  A,M
0161 2B          481           DCX  H
0162 77          482           MOV  M,A
0163 FB          483           EI
0164 23          484           INX  H
0165 23          485           INX  H
0166 35          486           DCR  M
0167 C26F01      487           JNZ  RST757
016A 3608        488           MVI  M,8
016C CD4502      489           CALL DSPLY
016F CD7801      490  RST757:  CALL KEYBD
0172 C1          491  RST758:  POP  B
```

```
0173 D1           492           POP  D
0174 E1           493           POP  H
0175 F1           494           POP  PSW
0176 FB           495           EI
0177 C9           496           RET
                  497
0178 3A3D22       498  KEYBD:   LDA  KYSHFT
017B 210226       499           LXI  H,KBDSCN
017E 77           500           MOV  M,A
017F 3A3922       501           LDA  LEDST
0182 23           502           INX  H
0183 E3           503           XTHL
0184 E3           504           XTHL
0185 E3           505           XTHL
0186 E3           506           XTHL
0187 46           507           MOV  B,M
0188 2B           508           DCX  H
0189 77           509           MOV  M,A
018A 78           510           MOV  A,B
018B 2F           511           CMA
018C E63C         512           ANI  3CH
018E 1F           513           RAR
018F 1F           514           RAR
0190 C2A601       515           JNZ  KEYBD1
0193 213E22       516           LXI  H,KEYSAV
0196 77           517           MOV  M,A
0197 2B           518           DCX  H
0198 7E           519           MOV  A,M
0199 1F           520           RAR
019A 77           521           MOV  M,A
019B 2B           522           DCX  H
019C 7E           523           MOV  A,M
019D 3D           524           DCR  A
019E 77           525           MOV  M,A
019F C0           526           RNZ
01A0 3608         527           MVI  M,8
01A2 23           528           INX  H
01A3 3680         529           MVI  M,80H
01A5 C9           530           RET
01A6 47           531  KEYBD1:  MOV  B,A
01A7 213E22       532           LXI  H,KEYSAV
01AA 7E           533           MOV  A,M
01AB A7           534           ANA  A
01AC C0           535           RNZ
01AD 78           536           MOV  A,B
01AE 0E04         537           MVI  C,4
01B0 1F           538  KEYBD2:  RAR
01B1 DAB801       539           JC   KEYBD3
01B4 0D           540           DCR  C
01B5 C2B001       541           JNZ  KEYBD2
01B8 A7           542  KEYBD3:  ANA  A
01B9 C0           543           RNZ
01BA 0D           544           DCR  C
01BB 3A3C22       545           LDA  SCANCT
01BE 3D           546           DCR  A
01BF 17           547           RAL
01C0 17           548           RAL
01C1 81           549           ADD  C
01C2 F680         550           ORI  80H
01C4 77           551           MOV  M,A
01C5 23           552           INX  H
01C6 77           553           MOV  M,A
01C7 C9           554  KEYBDR:  RET
                  555
                  556
01C8 110238       557  CHKSUM:  LXI  D,BAUD
01CB 1A           558           LDAX D
01CC 01FE00       559           LXI  B,0FEH
01CF 17           560           RAL
01D0 D2D601       561           JNC  $+6
01D3 01FE03       562           LXI  B,3FEH
01D6 210000       563           LXI  H,0
01D9 1A           564  CHKSM1:  LDAX D
01DA 85           565           ADD  L
01DB 6F           566           MOV  L,A
```

```
01DC 3E00       567             MVI  A, 0
01DE 8C         568             ADC  H
01DF 67         569             MOV  H, A
01E0 0B         570             DCX  B
01E1 78         571             MOV  A, B
01E2 B1         572             ORA  C
01E3 13         573             INX  D
01E4 C2D901     574             JNZ  CHKSM1
01E7 EB         575             XCHG
01E8 2A0038     576             LHLD CHKSM
01EB 7D         577             MOV  A, L
01EC BB         578             CMP  E
01ED C0         579             RNZ
01EE 7C         580             MOV  A, H
01EF BA         581             CMP  D
01F0 C9         582             RET
                583
01F1 3A0238     584     BAUDRT: LDA  BAUD
01F4 E603       585             ANI  03H
01F6 47         586             MOV  B, A
01F7 87         587             ADD  A
01F8 80         588             ADD  B
01F9 211102     589             LXI  H, BAUDTB
01FC 85         590             ADD  L
01FD 6F         591             MOV  L, A
01FE 7C         592             MOV  A, H
01FF CE00       593             ACI  0
0201 67         594             MOV  H, A
0202 7E         595             MOV  A, M
0203 320426     596             STA  U15TMR
0206 23         597             INX  H
0207 7E         598             MOV  A, M
0208 320526     599             STA  U15TMR+1
020B 23         600             INX  H
020C 7E         601             MOV  A, M
020D 324A22     602             STA  60FDIV
0210 C9         603             RET
                604
0211 5DE4       605     BAUDTB: DW   9309 OR 0C000H
0213 07         606             DB   7
0214 55CD       607             DW   3413 OR 0C000H
0216 13         608             DB   19
0217 ABC6       609             DW   1707 OR 0C000H
0219 26         610             DB   38
021A 55C3       611             DW   853  OR 0C000H
021C 4B         612             DB   75
                613
021D 8D         614     MESG1:  DB   'M' AND 3FH OR 80H
021E 85         615             DB   'E' AND 3FH OR 80H
021F 8D         616             DB   'M' AND 3FH OR 80H
0220 A0         617             DB   ' ' AND 3FH OR 80H
0221 86         618             DB   'F' AND 3FH OR 80H
0222 81         619             DB   'A' AND 3FH OR 80H
0223 89         620             DB   'I' AND 3FH OR 80H
0224 8C         621             DB   'L' AND 3FH OR 80H
                622
                623
0225 07         624     INIT1   DB   'G' AND 3FH
0226 0F         625             DB   'O' AND 3FH
0227 0F         626             DB   'O' AND 3FH
0228 04         627             DB   'D' AND 3FH
0229 19         628             DB   'Y' AND 3FH
022A 05         629             DB   'E' AND 3FH
022B 01         630             DB   'A' AND 3FH
022C 12         631             DB   'R' AND 3FH
022D 00         632             DB   0, 0, 0, 0, 8, 80H, 0, 0
022E 00
022F 00
0230 00
0231 08
0232 80
0233 00
0234 00
0235 00         633             DB   0, 0, 0, 0, 0, 0, 0, 0
0236 00
```

```
0237  00
0238  00
0239  00
023A  00
023B  00
023C  00
023D  80         634            DB  80H,1,1,1,0,0,0,0
023E  01
023F  01
0240  01
0241  00
0242  00
0243  00
0244  00
                 635
0245  110020     636   DSPLY:   LXI  D,DISPLY
0248  1A         637            LDAX D
0249  3EF0       638            MVI  A,0F0H
024B  12         639            STAX D
024C  320820     640            STA  DISPLY+8
024F  213022     641            LXI  H,ASCBUF
0252  0608       642            MVI  B,8
0254  3A3822     643   DSPLY1:  LDA  ASCFG
0257  A6         644            ANA  M
0258  7E         645            MOV  A,M
0259  F25E02     646            JP   DSPLY2
025C  3E20       647            MVI  A,20H
025E  E5         648   DSPLY2:  PUSH H
025F  6F         649            MOV  L,A
0260  E640       650            ANI  40H
0262  87         651            ADD  A
0263  2F         652            CMA
0264  4F         653            MOV  C,A
0265  7D         654            MOV  A,L
0266  E63F       655            ANI  3FH
0268  87         656            ADD  A
0269  C696       657            ADI  SEGTBL LOW
026B  6F         658            MOV  L,A
026C  3E02       659            MVI  A,SEGTBL HIGH
026E  CE00       660            ACI  0
0270  67         661            MOV  H,A
0271  7E         662            MOV  A,M
0272  12         663            STAX D
0273  23         664            INX  H
0274  7E         665            MOV  A,M
0275  A1         666            ANA  C
0276  13         667            INX  D
0277  12         668            STAX D
0278  13         669            INX  D
0279  E1         670            POP  H
027A  23         671            INX  H
027B  05         672            DCR  B
027C  C25402     673            JNZ  DSPLY1
027F  213822     674            LXI  H,ASCFG
0282  7E         675            MOV  A,M
0283  EE80       676            XRI  80H
0285  77         677            MOV  M,A
0286  213A22     678            LXI  H,ALEDS
0289  7E         679            MOV  A,M
028A  23         680            INX  H
028B  B6         681            ORA  M
028C  3600       682            MVI  M,0
028E  323922     683            STA  LEDST
0291  C9         684            RET
                 685
                 686
0292             687            DS   4
0296  78E1       688   SEGTBL:  DW   0E178H,0B171H,0F948H,0C070H
0298  71B1
029A  48F9
029C  70C0
029E  48F8       689            DW   0F848H,0C071H,8071H,0D170H
02A0  71C0
02A2  7180
02A4  70D1
```

```
02A6  31B1
02A8  48C8              690              DW  0B131H, 0C848H, 0F010H, 8631H
02AA  10F0
02AC  3186
02AE  30C0              691              DW  0C030H, 0B232H, 0B432H, 0F070H
02B0  32B2
02B2  32B4
02B4  70F0
02B6  71A1              692              DW  0A171H, 0F470H, 0A571H, 0D161H
02B8  70F4
02BA  71A5
02BC  61D1
02BE  4888              693              DW  8848H, 0F030H, 8234H, 0B434H
02C0  30F0
02C2  3482
02C4  34B4
02C6  0686              694              DW  8606H, 8A02H, 0C345H, 8600H
02C8  028A
02CA  45C3
02CC  0086
02CE  0284              695              DW  8402H, 8006H, 0484H, 0780H
02D0  0680
02D2  8404
02D4  8007
02D6  0080              696              DW  8000H, 2000H, 0A008H, 0FFFFH
02D8  0020
02DA  08A0
02DC  FFFF
02DE  69D9              697              DW  0D969H, 9224H, 0D46DH, 8200H
02E0  2492
02E2  6DD4
02E4  0082
02E6  0086              698              DW  8600H, 8006H, 8F0FH, 8909H
02E8  0680
02EA  0F8F
02EC  0989
02EE  0480              699              DW  8004H, 8101H, 0000H, 800CH
02F0  0181
02F2  0000
02F4  0C80
02F6  74F2              700              DW  0F274H, 8808H, 0E151H, 0F140H
02F8  0888
02FA  51E1
02FC  40F1
02FE  21B1              701              DW  0B121H, 0C461H, 0D171H, 0B040H
0300  61C4
0302  71D1
0304  40B0
0306  71F1              702              DW  0F171H, 0F161H, 8200H, 8400H
0308  61F1
030A  0082
030C  0084
030E  0086              703              DW  8600H, 0C101H, 8006H, 0A9: +
0310  01C1
0312  0680
0314  60A9
                        704
0316  7E                705  XFRDN       MOV  A, M
0317  EB                706              XCHG
0318  77                707              MOV  M, A
0319  EB                708              XCHG
031A  23                709              INX  H
031B  13                710              INX  D
031C  0B                711              DCX  B
031D  78                712              MOV  A, B
031E  B1                713              ORA  C
031F  C21603            714              JNZ  XFRDN
0322  C9                715              RET
                        716
0323  D5                717  FILMEM:     PUSH D
0324  57                718              MOV  D, A
0325  72                719  FILMM2:     MOV  M, D
0326  23                720              INX  H
0327  0B                721              DCX  B
0328  78                722              MOV  A, B
```

```
0329  B1              723            ORA  C
032A  C22503          724            JNZ  FILMM2
032D  D1              725            POP  D
032E  C9              726            RET
                      727
032F  116400          728  DLY100:   LXI  D,100
0332  06BF            729  DLYMS:    MVI  B,191
0334  05              730            DCR  B
0335  C23403          731            JNZ  DLYMS+2
0338  1B              732            DCX  D
0339  7B              733            MOV  A,E
033A  B2              734            ORA  D
033B  C23203          735            JNZ  DLYMS
033E  C9              736            RET
                      737
033F  3E05            738  EXEC:     MVI  A,005H
0341  323A22          739            STA  ALEDS
0344  3E00            740            MVI  A,0
0346  324E22          741            STA  TEST
0349  210438          742            LXI  H,CBUFF
034C  7E              743            MOV  A,M
034D  23              744            INX  H
034E  86              745            ADD  M
034F  23              746            INX  H
0350  86              747            ADD  M
0351  23              748            INX  H
0352  86              749            ADD  M
0353  23              750            INX  H
0354  86              751            ADD  M
0355  23              752            INX  H
0356  BE              753            CMP  M
0357  3A4E22          754            LDA  TEST
035A  C26503          755            JNZ  $+11
035D  F640            756            ORI  040H
035F  324E22          757            STA  TEST
0362  C36F03          758            JMP  ALOC
0365  3E30            759            MVI  A,30H
0367  0605            760            MVI  B,5
0369  2B              761            DCX  H
036A  77              762            MOV  M,A
036B  05              763            DCR  B
036C  C26903          764            JNZ  $-3
                      765            ;
                      766            ;
                      767
036F  3A4822          768  ALOC:     LDA  RCVDTB
0372  C680            769            ADI  080H
0374  FA7104          770            JM   UDATIN
0377  218122          771            LXI  H,OLDTRG
037A  3A0126          772            LDA  OPTOIN
037D  00              773            NOP
037E  46              774            MOV  B,M
037F  77              775            MOV  M,A
0380  A8              776            XRA  B
0381  A0              777            , ,A ,
0382  1F              778            RAR
0383  D29503          779            JNC  NUREY
0386  3A4322          780            LDA  XMTDTB
0389  87              781            ADD  A
038A  D29503          782            JNC  NUREY
038D  3A5722          783            LDA  XMTPTR
0390  D656            784            SUI  LOW XMTBUF+7
0392  CA6604          785            JZ   EXTRIG
                      786
                      787
0395  3A3F22          788  NUREY:    LDA  KEYDAT
0398  C680            789            ADI  80H
039A  FA6F03          790            JM   ALOC
039D  323F22          791            STA  KEYDAT
03A0  FE08            792            CPI  8H
03A2  C2B203          793            JNZ  $+16
03A5  3A3A22          794            LDA  ALEDS
03A8  E6E3            795            ANI  0E3H
03AA  F604            796            ORI  004H
03AC  323A22          797            STA  ALEDS
```

```
03AF C35B04    798            JMP  DIPS
03B2 FE0C      799            CPI  0CH
03B4 C2CC03    800            JNZ  $+24
03B7 3A4E22    801            LDA  TEST
03BA E640      802            ANI  040H
03BC CA6F03    803            JZ   ALOC
03BF 3A3A22    804            LDA  ALEDS
03C2 E6E3      805            ANI  0E3H
03C4 F608      806            ORI  008H
03C6 323A22    807            STA  ALEDS
03C9 C35B04    808            JMP  DIPS
               809            ;
03CC FE10      810            CPI  10H
03CE C2E603    811            JNZ  $+24
03D1 3A4E22    812            LDA  TEST
03D4 E640      813            ANI  040H
03D6 CA6F03    814            JZ   ALOC
03D9 3A3A22    815            LDA  ALEDS
03DC E6E3      816            ANI  0E3H
03DE F610      817            ORI  010H
03E0 323A22    818            STA  ALEDS
03E3 C35B04    819            JMP  DIPS
               820            ;
03E6 FE01      821            CPI  01H
03E8 CAF003    822            JZ   $+8
03EB FE02      823            CPI  02H
03ED C2FF06    824            JNZ  LABLK
03F0 47        825            MOV  B,A
03F1 3E80      826  NXTST:    MVI  A,80H
03F3 325822    827            STA  AFLAG
03F6 21100E    828            LXI  H,3600
03F9 227F22    829            SHLD TCOUNT
03FC 210000    830            LXI  H,0
03FF 225C22    831            SHLD LCOUNT
0402 3A3A22    832            LDA  ALEDS
0405 E6FE      833            ANI  0FEH
0407 323A22    834            STA  ALEDS
040A 3A4E22    835            LDA  TEST
040D E640      836            ANI  040H
040F B0        837            ORA  B
0410 324E22    838            STA  TEST
0413 78        839            MOV  A,B
0414 2F        840            CMA
0415 E601      841            ANI  01H
0417 F608      842            ORI  08H
0419 30        843            SIM
041A 1F        844            RAR
041B 3E00      845            MVI  A,0
041D 1F        846            RAR
041E 325922    847            STA  BFLAG
               848            ;
               849
0421 3A4822    850            LDA  RCVDTB
0424 C680      851            ADI  80H
0426 FA4004    852            JM   ENDTST
0429 3A3F22    853            LDA  KEYDAT
042C C680      854            ADI  80H
042E FA2104    855            JM   $-13
0431 323F22    856            STA  KEYDAT
0434 CA4004    857            JZ   ENDTST
0437 FE03      858            CPI  3
0439 D22104    859            JNC  $-24
043C 47        860            MOV  B,A
043D C3F103    861            JMP  NXTST
               862            ;
0440 3E00      863  ENDTST:   MVI  A,00H
0442 325922    864            STA  BFLAG
0445 3E09      865            MVI  A,09H
0447 30        866            SIM
0448 3A4E22    867            LDA  TEST
044B E640      868            ANI  040H
044D 324E22    869            STA  TEST
0450 3A3A22    870            LDA  ALEDS
0453 F601      871            ORI  001H
0455 323A22    872            STA  ALEDS
```

```
0458 C36F03      873            JMP  ALOC
                 874         ;
045B 3A4E22      875  DIPS:   LDA  TEST
045E F620        876          ORI  020H
0460 324E22      877          STA  TEST
0463 C31E06      878          JMP  DIPP
                 879         ;
                 880         ;
                 881         ;
0466 3A3A22      882  EXTRIG: LDA  ALEDS
0469 F680        883          ORI  80H
046B 323A22      884          STA  ALEDS
046E C3DE04      885          JMP  BLOC
                 886         ;
0471 324822      887  UDATIN: STA  RCVDTB
0474 FE91        888          CPI  91H
0476 C28604      889          JNZ  $+16
0479 3A3A22      890          LDA  ALEDS
047C E663        891          ANI  063H
047E F604        892          ORI  004H
0480 323A22      893          STA  ALEDS
0483 C3DE04      894          JMP  BLOC
                 895         ;
0486 FE92        896          CPI  092H
0488 C2A004      897          JNZ  $+24
048B 3A4E22      898          LDA  TEST
048E E640        899          ANI  040H
0490 CABA04      900          JZ   BADCAL
0493 3A3A22      901          LDA  ALEDS
0496 E663        902          ANI  063H
0498 F608        903          ORI  008H
049A 323A22      904          STA  ALEDS
049D C3DE04      905          JMP  BLOC
                 906
04A0 FE93        907          CPI  093H
04A2 C26F03      908          JNZ  ALOC
04A5 3A4E22      909          LDA  TEST
04A8 E640        910          ANI  040H
04AA CABA04      911          JZ   BADCAL
04AD 3A3A22      912          LDA  ALEDS
04B0 E663        913          ANI  063H
04B2 F610        914          ORI  010H
04B4 323A22      915          STA  ALEDS
04B7 C3DE04      916          JMP  BLOC
                 917         ;
04BA 3A5722      918  BADCAL: LDA  XMTPTR
04BD FE55        919          CPI  LOW(XMTBUF+6)
04BF C26F03      920          JNZ  ALOC
04C2 211534      921          LXI  H,3415H
04C5 224F22      922          SHLD XMTBUF
04C8 212020      923          LXI  H,2020H
04CB 225122      924          SHLD XMTBUF+2
04CE 225322      925          SHLD XMTBUF+4
04D1 3EC9        926          MVI  A,0C9H
04D3 325522      927          STA  XMTBUF+6
04D6 3E4F        928          MVI  A,LOW XMTBUF
04D8 325722      929          STA  XMTPTR
04DB C38907      930          JMP  ZLOC
                 931         ;
                 932
04DE F3          933  BLOC:   DI
04DF 3A4E22      934          LDA  TEST
04E2 F620        935          ORI  020H
04E4 324E22      936          STA  TEST
04E7 213F0B      937          LXI  H,2879D
04EA 225C22      938          SHLD LCOUNT
04ED 210000      939          LXI  H,0
04F0 225A22      940          SHLD NCOUNT
04F3 227F22      941          SHLD TCOUNT
04F6 21C000      942          LXI  H,00C0H
04F9 225822      943          SHLD AFLAG
04FC 3E42        944          MVI  A,042H
04FE 320026      945          STA  U15CTL
0501 3E43        946          MVI  A,043H
0503 320027      947          STA  U14CTL
0506 21FF7F      948          LXI  H,07FFFH
```

```
0509 220426      949          SHLD U15TMR
050C 220427      950          SHLD U14TMR
050F 3E18        951          MVI  A,018H
0511 30          952          SIM
0512 FB          953          EI
0513 00          954          NOP
0514 00          955          NOP
0515 00          956          NOP
0516 00          957          NOP
0517 3E40        958          MVI  A,040H
0519 325822      959          STA  AFLAG
                 960          ;
051C 21D007      961          LXI  H,2000
051F 2B          962          DCX  H
0520 7D          963          MOV  A,L
0521 B4          964          ORA  H
0522 3E01        965          MVI  A,1
0524 CA5F05      966          JZ   FAULT
0527 3A5922      967          LDA  BFLAG
052A A7          968          ANA  A
052B CA1F05      969          JZ   $-12
                 970          ;
052E 2B          971          DCX  H
052F 7D          972          MOV  A,L
0530 B4          973          ORA  H
0531 3E02        974          MVI  A,2
0533 CA5F05      975          JZ   FAULT
0536 3A5822      976          LDA  AFLAG
0539 FE80        977          CPI  080H
053B C22E05      978          JNZ  $-13
                 979          ;
053E 2A0427      980          LHLD U14TMR
0541 225E22      981          SHLD AFIRST
                 982          ;
0544 2A7F22      983          LHLD TCOUNT
0547 3E04        984          MVI  A,HIGH 1200
0549 94          985          SUB  H
054A 67          986          MOV  H,A
054B 3EB0        987          MVI  A,LOW 1200
054D 95          988          SUB  L
054E B4          989          ORA  H
054F 3E03        990          MVI  A,3
0551 CA5F05      991          JZ   FAULT
0554 3A5822      992          LDA  AFLAG
0557 FEC0        993          CPI  0C0H
0559 C24405      994          JNZ  $-21
055C C3B705      995          JMP  MDONE
                 996          ;
                 997          ;
055F F3          998  FAULT:  DI
0560 C630        999          ADI  30H
0562 6F         1000          MOV  L,A
0563 2620       1001          MVI  H,20H
0565 223422     1002          SHLD ASCBUF+4
0568 225022     1003          SHLD XMTBUF+1
056B 2E20       1004          MVI  L,20H
056D 223622     1005          SHLD ASCBUF+6
0570 225222     1006          SHLD XMTBUF+3
0573 C695       1007          ADI  95H
0575 67         1008          MOV  H,A
0576 225422     1009          SHLD XMTBUF+5
0579 3E15       1010          MVI  A,015H
057B 324F22     1011          STA  XMTBUF
057E 210512     1012          LXI  H,01205H
0581 223022     1013          SHLD ASCBUF
0584 21123D     1014          LXI  H,03D12H
0587 223222     1015          SHLD ASCBUF+2
058A 3E4F       1016          MVI  A,LOW XMTBUF
058C 325722     1017          STA  XMTPTR
058F 3E42       1018          MVI  A,042H
0591 320026     1019          STA  U15CTL
0594 CDF101     1020          CALL BAUDRT
0597 3EC2       1021          MVI  A,0C2H
0599 320026     1022          STA  U15CTL
059C 3A4E22     1023          LDA  TEST
059F E6DF       1024          ANI  0DFH
```

```
05A1  324E22    1025         STA  TEST
05A4  3E17      1026         MVI  A,019H
05A6  30        1027         SIM
05A7  3E00      1028         MVI  A,00H
05A9  325922    1029         STA  BFLAG
05AC  FB        1030         EI
05AD  3A3A22    1031         LDA  ALEDS
05B0  A7        1032         ANA  A
05B1  FA6F03    1033         JM   ALOC
05B4  C38907    1034         JMP  ZLOC
                1035
                1036
05B7  F3        1037  MDONE: DI
05B8  3A4E22    1038         LDA  TEST
05BB  E6DF      1039         ANI  0DFH
05BD  324E22    1040         STA  TEST
05C0  2A0427    1041         LHLD U14TMR
05C3  226422    1042         SHLD ALAST
05C6  2A0426    1043         LHLD U15TMR
05C9  226A22    1044         SHLD BFIRST
05CC  CDF101    1045         CALL BAUDRT
05CF  3EC2      1046         MVI  A,0C2H
05D1  320024    1047         STA  U15CTL
05D4  FB        1048         EI
                1049
05D5  215E22    1050         LXI  H,AFIRST
05D8  CDC707    1051         CALL ADJUST
05DB  216422    1052         LXI  H,ALAST
05DE  CDC707    1053         CALL ADJUST
05E1  216A22    1054         LXI  H,BFIRST
05E4  CDC707    1055         CALL ADJUST
                1056         ;
05E7  CDE507    1057         CALL DODO
05EA  2A5E22    1058         LHLD AFIRST
05ED  EB        1059         XCHG
05EE  2A6422    1060         LHLD ALAST
05F1  19        1061         DAD  D
05F2  EB        1062         XCHG
05F3  2A6A22    1063         LHLD BFIRST
05F6  19        1064         DAD  D
05F7  225E22    1065         SHLD AFIRST
05FA  3A6C22    1066         LDA  BFIRST+2
05FD  CE00      1067         ACI  0
05FF  326022    1068         STA  AFIRST+2
                1069         ;
                1070         ;
0602  015E22    1071         LXI  B,AFIRST
0605  117022    1072         LXI  D,BLAST
0608  21400B    1073         LXI  H,2880
060B  CD0708    1074         CALL MULT5
060E  016A22    1075         LXI  B,BFIRST
0611  116422    1076         LXI  D,ALAST
0614  2A5A22    1077         LHLD NCOUNT
0617  23        1078         INX  H
0618  CD0708    1079         CALL MULT5
                1080
061B  CD5208    1081         CALL DIV55
                1082
                1083         ;
                1084         ;
061E  2A7C22    1085  DIPP:  LHLD RATIO
0621  3A7E22    1086         LDA  RATIO+2
0624  225E22    1087         SHLD AFIRST
0627  326022    1088         STA  AFIRST+2
                1089         ;
062A  3A3A22    1090         LDA  ALEDS
062D  E618      1091         ANI  018H
062F  21A086    1092         LXI  H,34464
0632  CA4306    1093         JZ   $+17
0635  E610      1094         ANI  010H
0637  2A0A38    1095         LHLD CVAL
063A  CA4306    1096         JZ   $+9
063D  7C        1097         MOV  A,H
063E  1F        1098         RAR
063F  67        1099         MOV  H,A
0640  7D        1100         MOV  A,L
```

```
0641 1F          1101          RAR
0642 6F          1102          MOV  L,A
0643 015E22      1103          LXI  B,AFIRST
0646 116A22      1104          LXI  D,BFIRST
0649 CD0708      1105          CALL MULT5
                 1106          ;
064C 3A3A22      1107          LDA  ALEDS
064F E618        1108          ANI  018H
0651 C27006      1109          JNZ  $+31
0654 2A7C22      1110          LHLD RATIO
0657 EB          1111          XCHG
0658 2A6C22      1112          LHLD BFIRST+2
065B 3A7E22      1113          LDA  RATIO+2
065E 47          1114          MOV  B,A
065F 3A6E22      1115          LDA  BFIRST+4
0662 19          1116          DAD  D
0663 88          1117          ADC  B
0664 226C22      1118          SHLD BFIRST+2
0667 326E22      1119          STA  BFIRST+4
066A 3E00        1120          MVI  A,0
066C 8F          1121          ADC  A
066D 326F22      1122          STA  BFIRST+5
0670 216D22      1123          LXI  H,BFIRST+3
0673 CDD308      1124          CALL BCDCON
0676 3A4E22      1125          LDA  TEST
0679 47          1126          MOV  B,A
067A E6DF        1127          ANI  0DFH
067C 324E22      1128          STA  TEST
                 1129          ;
067F 3A3A22      1130          LDA  ALEDS
0682 E604        1131          ANI  004H
0684 213222      1132          LXI  H,ASCBUF+2
0687 C28C06      1133          JNZ  $+5
068A 23          1134          INX  H
068B 23          1135          INX  H
068C 7E          1136          MOV  A,M
068D F640        1137          ORI  040H
068F 77          1138          MOV  M,A
                 1139          ;
0690 78          1140          MOV  A,B
0691 E620        1141          ANI  020H
0693 C26F03      1142          JNZ  ALOC
0696 C3AC06      1143          JMP  QUARK
                 1144          ;
0699 212038      1145  QUME:   LXI  H,CMOS+20H
069C 114038      1146          LXI  D,CMOS+40H
069F 060A        1147          MVI  B,10
06A1 7E          1148          MOV  A,M
06A2 12          1149          STAX D
06A3 23          1150          INX  H
06A4 13          1151          INX  D
06A5 05          1152          DCR  B
06A6 C2A106      1153          JNZ  $-5
06A9 C36F03      1154          JMP  ALOC
                 1155          ;
                 1156          ;
                 1157          ;
06AC 3A3A22      1158  QUARK:  LDA  ALEDS
06AF A7          1159          ANA  A
06B0 F2D606      1160          JP   INTRIG
06B3 3A3522      1161          LDA  ASCBUF+5
06B6 E60F        1162          ANI  0FH
06B8 87          1163          ADD  A
06B9 87          1164          ADD  A
06BA 87          1165          ADD  A
06BB 87          1166          ADD  A
06BC 67          1167          MOV  H,A
06BD 3A3622      1168          LDA  ASCBUF+6
06C0 E60F        1169          ANI  0FH
06C2 B4          1170          ORA  H
06C3 CA9906      1171          JZ   QUME
06C6 FE99        1172          CPI  099H
06C8 CA9906      1173          JZ   QUME
06CB C36F03      1174  BREAK:  JMP  ALOC
06CE 3E4F        1175          MVI  A,LOW XMTBUF
```

```
06D0 325722      1176            STA  XMTPTR
06D3 C36F03      1177            JMP  ALOC
                 1178       ;
                 1179       ;
06D6 3E06        1180  INTRIG:   MVI  A,06H
06D8 324F22      1181            STA  XMTBUF
06DB 2A3322      1182            LHLD ASCBUF+3
06DE 7C          1183            MOV  A,H
06DF E6BF        1184            ANI  0BFH
06E1 67          1185            MOV  H,A
06E2 225022      1186            SHLD XMTBUF+1
06E5 84          1187            ADD  H
06E6 85          1188            ADD  L
06E7 2A3522      1189            LHLD ASCBUF+5
06EA 225222      1190            SHLD XMTBUF+3
06ED 84          1191            ADD  H
06EE 85          1192            ADD  L
06EF 2A3722      1193            LHLD ASCBUF+7
06F2 85          1194            ADD  L
06F3 67          1195            MOV  H,A
06F4 225422      1196            SHLD XMTBUF+5
06F7 3E4F        1197            MVI  A,LOW XMTBUF
06F9 325722      1198            STA  XMTPTR
06FC C38907      1199            JMP  ZLOC
                 1200       ;
                 1201       ;
06FF FE17        1202  LABLK:    CPI  17H
0701 C26F03      1203            JNZ  ALOC
0704 212003      1204            LXI  H,0320H
0707 223022      1205            SHLD ASCBUF
070A 2E3D        1206            MVI  L,3DH
070C 3A0438      1207            LDA  CBUFF
070F 67          1208            MOV  H,A
0710 223222      1209            SHLD ASCBUF+2
0713 2A0538      1210            LHLD CBUFF+1
0716 223422      1211            SHLD ASCBUF+4
0719 2A0738      1212            LHLD CBUFF+3
071C 223622      1213            SHLD ASCBUF+6
071F CD3E09      1214            CALL COMBO
0722 C26F03      1215            JNZ  ALOC
0725 3A3A22      1216            LDA  ALEDS
0728 F640        1217            ORI  40H
072A 323A22      1218            STA  ALEDS
                 1219       ;
072D CD7F09      1220  CLOP:     CALL KEYNO
0730 323F22      1221            STA  KEYDAT
0733 CD5609      1222            CALL NUMCON
0736 C25707      1223            JNZ  CLIP
0739 2A0538      1224            LHLD CBUFF+1
073C 220438      1225            SHLD CBUFF
073F 223322      1226            SHLD ASCBUF+3
0742 2A0738      1227            LHLD CBUFF+3
0745 220638      1228            SHLD CBUFF+2
0748 223522      1229            SHLD ASCBUF+5
074B 79          1230            MOV  A,C
074C C630        1231            ADI  30H
074E 320838      1232            STA  CBUFF+4
0751 323722      1233            STA  ASCBUF+7
0754 C32D07      1234            JMP  CLOP
                 1235       ;
0757 FE1F        1236  CLIP:     CPI  1FH
0759 C22D07      1237            JNZ  CLOP
075C 210438      1238            LXI  H,CBUFF
075F 0605        1239            MVI  B,5
0761 AF          1240            XRA  A
0762 86          1241            ADD  M
0763 23          1242            INX  H
0764 05          1243            DCR  B
0765 C26207      1244            JNZ  $-3
0768 77          1245            MOV  M,A
                 1246       ;
0769 3A4E22      1247            LDA  TEST
076C F640        1248            ORI  040H
076E 324E22      1249            STA  TEST
                 1250       ;
```

```
0771 210438    1251          LXI  H,CBUFF
0774 CDB408    1252          CALL ASCON
0777 220A38    1253          SHLD CVAL
077A 3A3A22    1254          LDA  ALEDS
077D E6BF      1255          ANI  0BFH
077F 323A22    1256          STA  ALEDS
0782 3A4E22    1257          LDA  TEST
0785 A7        1258          ANA  A
0786 F26F03    1259          JP   ALOC
               1260          ;
0789 3A4822    1261  ZLOC.   LDA  RCVDTB
078C C680      1262          ADI  080H
078E F28907    1263          JP   ZLOC
0791 324822    1264          STA  RCVDTB
0794 FE86      1265          CPI  086H
0796 CA6F03    1266          JZ   ALOC
0799 67        1267          MOV  H,A
079A D691      1268          SUI  91H
079C FE03      1269          CPI  3H
079E 7C        1270          MOV  A,H
079F DA7104    1271          JC   UDATIN
07A2 218000    1272          LXI  H,128
07A5 2B        1273          DCX  H
07A6 7C        1274          MOV  A,H
07A7 B5        1275          ORA  L
07A8 C2A507    1276          JNZ  $-3
07AB 3A5722    1277          LDA  XMTPTR
07AE FE56      1278          CPI  LOW (XMTBUF+7)
07B0 C28907    1279          JNZ  ZLOC
07B3 3E4F      1280          MVI  A,LOW XMTBUF
07B5 325722    1281          STA  XMTPTR
07B8 C38907    1282          JMP  ZLOC
               1283          ;
               1284          ;
               1285          ;
               1286          ;
07BB 1A        1287  SUB3:   LDAX D
07BC 96        1288          SUB  M
07BD 77        1289          MOV  M,A
07BE CDC107    1290          CALL $+3
07C1 23        1291          INX  H
07C2 13        1292          INX  D
07C3 1A        1293          LDAX D
07C4 9E        1294          SBB  M
07C5 77        1295          MOV  M,A
07C6 C9        1296          RET
               1297          ;
               1298          ;
               1299          ;
07C7 7E        1300  ADJUST: MOV  A,M
07C8 5F        1301          MOV  E,A
07C9 23        1302          INX  H
07CA 7E        1303          MOV  A,M
07CB 57        1304          MOV  D,A
07CC E63F      1305          ANI  03FH
07CE EB        1306          XCHG
               1307
               1308
               1309
07CF 7C        1310          MOV  A,H
07D0 F6C0      1311          ORI  0C0H
07D2 2F        1312          CMA
07D3 1F        1313          RAR
07D4 67        1314          MOV  H,A
07D5 7D        1315          MOV  A,L
07D6 2F        1316          CMA
07D7 1F        1317          RAR
07D8 6F        1318          MOV  L,A
               1319          ;
07D9 01FE1F    1320          LXI  B,1FFEH
07DC D2E007    1321          JNC  $+4
07DF 09        1322          DAD  B
07E0 EB        1323          XCHG
               1324
               1325
               1326
```

```
07E1  72              1327          MOV  M,D
07E2  2B              1328          DCX  H
07E3  73              1329          MOV  M,E
07E4  C9              1330          RET
                      1331          ;
                      1332          ;
                      1333          ;
                      1334          ;
07E5  2A7F22          1335  DODO:   LHLD TCOUNT
                      1336
07E8  44              1337          MOV  B,H
07E9  4D              1338          MOV  C,L
07EA  29              1339          DAD  H
07EB  29              1340          DAD  H
07EC  29              1341          DAD  H
07ED  29              1342          DAD  H
07EE  29              1343          DAD  H
07EF  29              1344          DAD  H
07F0  AF              1345          XRA  A
07F1  91              1346          SUB  C
07F2  4F              1347          MOV  C,A
07F3  7D              1348          MOV  A,L
07F4  98              1349          SBB  B
07F5  47              1350          MOV  B,A
07F6  7C              1351          MOV  A,H
07F7  DE00            1352          SBI  0
07F9  EB              1353          XCHG
07FA  2A6A22          1354          LHLD BFIRST
07FD  09              1355          DAD  B
07FE  CE00            1356          ACI  0
0800  326C22          1357          STA  BFIRST+2
0803  226A22          1358          SHLD BFIRST
0806  C9              1359          RET
                      1360          ;
                      1361          ;
                      1362          ;
0807  E5              1363  MULT5:  PUSH H
0808  EB              1364          XCHG
0809  1E10            1365          MVI  E,16
080B  1606            1366          MVI  D,6
080D  AF              1367          XRA  A
080E  77              1368          MOV  M,A
080F  23              1369          INX  H
0810  15              1370          DCR  D
0811  C20E08          1371          JNZ  $-3
0814  03              1372          INX  B
0815  03              1373          INX  B
0816  03              1374          INX  B
0817  02              1375          STAX B
0818  03              1376          INX  B
0819  02              1377          STAX B
081A  2B              1378          DCX  H
081B  CD4808          1379          CALL DOWN4
                      1380          ;
081E  1605            1381  MULTLP: MVI  D,5
0820  A7              1382          ANA  A
0821  7E              1383          MOV  A,M
0822  8F              1384          ADC  A
0823  77              1385          MOV  M,A
0824  15              1386          DCR  D
0825  23              1387          INX  H
0826  C22108          1388          JNZ  $-5
0829  CD4C08          1389          CALL DOWNH
                      1390          ;
082C  E3              1391          XTHL
082D  29              1392          DAD  H
082E  E3              1393          XTHL
082F  D24108          1394          JNC  NOADD
0832  1605            1395          MVI  D,5
0834  A7              1396          ANA  A
0835  0A              1397          LDAX B
0836  8E              1398          ADC  M
0837  77              1399          MOV  M,A
0838  03              1400          INX  B
0839  23              1401          INX  H
```

```
083A 15         1402           DCR  D
083B C23508     1403           JNZ  $-6
083E CD4708     1404           CALL DOWN5
                1405           ;
0841 1D         1406  NOADD:   DCR  E
0842 C21E08     1407           JNZ  MULTLP
0845 E1         1408           POP  H
0846 C9         1409           RET
                1410           ;
0847 0B         1411  DOWN5:   DCX  B
0848 0B         1412  DOWN4:   DCX  B
0849 0B         1413           DCX  B
084A 0B         1414           DCX  B
084B 0B         1415           DCX  B
084C 2B         1416  DOWNH:   DCX  H
084D 2B         1417           DCX  H
084E 2B         1418           DCX  H
084F 2B         1419           DCX  H
0850 2B         1420           DCX  H
0851 C9         1421           RET
                1422           ;
                1423           ;
                1424           ;
0852 1E18       1425  DIV55:   MVI  E,24
0854 AF         1426           XRA  A
0855 326A22     1427           STA  BFIRST
0858 210000     1428           LXI  H,0
                1429           ;
085B E5         1430  DIVLOP:  PUSH H
085C 216422     1431           LXI  H,ALAST
085F 1606       1432           MVI  D,6
0861 A7         1433           ANA  A
0862 7E         1434           MOV  A,M
0863 8F         1435           ADC  A
0864 77         1436           MOV  M,A
0865 23         1437           INX  H
0866 15         1438           DCR  D
0867 C26208     1439           JNZ  $-5
                1440           ;
086A A7         1441           ANA  A
086B C28408     1442           JNZ  DIVSUB
                1443           ;
086E 016822     1444           LXI  B,ALAST+4
0871 217422     1445           LXI  H,BLAST+4
0874 1605       1446           MVI  D,5
0876 0A         1447           LDAX B
0877 BE         1448           CMP  M
0878 0B         1449           DCX  B
0879 2B         1450           DCX  H
087A DA9708     1451           JC   DIVNOT
087D C28408     1452           JNZ  DIVSUB
0880 15         1453           DCR  D
0881 C27608     1454           JNZ  $-11
                1455           ;
0884 016422     1456  DIVSUB:  LXI  B,ALAST
0887 217022     1457           LXI  H,BLAST
088A 1605       1458           MVI  D,5
088C A7         1459           ANA  A
088D 0A         1460           LDAX B
088E 9E         1461           SBB  M
088F 02         1462           STAX B
0890 03         1463           INX  B
0891 23         1464           INX  H
0892 15         1465           DCR  D
0893 C28D08     1466           JNZ  $-6
                1467           ;
0896 A7         1468           ANA  A
                1469           ;
0897 3F         1470  DIVNOT:  CMC
0898 E1         1471           POP  H
0899 7D         1472           MOV  A,L
089A 8F         1473           ADC  A
089B 6F         1474           MOV  L,A
089C 7C         1475           MOV  A,H
089D 8F         1476           ADC  A
```

```
089E  67          1477            MOV  H,A
089F  1D          1478            DCR  E
08A0  CAB008      1479            JZ   $+16
08A3  3E10        1480            MVI  A,16
08A5  BB          1481            CMP  E
08A6  C25B08      1482            JNZ  DIVLOP
08A9  7D          1483            MOV  A,L
08AA  327E22      1484            STA  RATIO+2
08AD  C35B08      1485            JMP  DIVLOP
08B0  227C22      1486            SHLD RATIO
08B3  C9          1487            RET
                  1488            ;
                  1489            ;
                  1490            ;
                  1491            ;
                  1492            ;
08B4  013005      1493   ASCON:   LXI  B,0530H
08B7  E5          1494            PUSH H
08B8  210000      1495            LXI  H,0
                  1496            ;
08BB  E3          1497   ASCLOP:  XTHL
08BC  7E          1498            MOV  A,M
08BD  23          1499            INX  H
08BE  91          1500            SUB  C
08BF  E3          1501            XTHL
                  1502            ;
08C0  5F          1503            MOV  E,A
08C1  1600        1504            MVI  D,0
08C3  19          1505            DAD  D
                  1506            ;
08C4  05          1507            DCR  B
08C5  CAD108      1508            JZ   $+12
                  1509            ;
08C8  29          1510            DAD  H
08C9  54          1511            MOV  D,H
08CA  5D          1512            MOV  E,L
08CB  29          1513            DAD  H
08CC  29          1514            DAD  H
08CD  19          1515            DAD  D
08CE  C3BB08      1516            JMP  ASCLOP
                  1517            ;
                  1518            ;
08D1  D1          1519            POP  D
08D2  C9          1520            RET
                  1521            ;
                  1522            ;
08D3  EB          1523   BCDCON:  XCHG
08D4  1A          1524            LDAX D
08D5  6F          1525            MOV  L,A
08D6  13          1526            INX  D
08D7  1A          1527            LDAX D
08D8  67          1528            MOV  H,A
08D9  13          1529            INX  D
08DA  1A          1530            LDAX D
08DB  A7          1531            ANA  A
08DC  CAE508      1532            JZ   $+9
08DF  11A015      1533            LXI  D,5536
08E2  19          1534            DAD  D
08E3  3E06        1535            MVI  A,6
08E5  11F0D8      1536   BCDCAN:  LXI  D,-10000
08E8  19          1537            DAD  D
08E9  3C          1538            INR  A
08EA  DAE808      1539            JC   $-2
08ED  111027      1540            LXI  D,10000
08F0  19          1541            DAD  D
08F1  C62F        1542            ADI  2FH
08F3  47          1543            MOV  B,A
08F4  3E00        1544            MVI  A,0
08F6  1118FC      1545            LXI  D,-1000
08F9  19          1546            DAD  D
08FA  3C          1547            INR  A
08FB  DAF908      1548            JC   $-2
08FE  11E803      1549            LXI  D,1000
0901  19          1550            DAD  D
0902  C62F        1551            ADI  2FH
0904  323422      1552            STA  ASCBUF+4
```

```
0907 3E00      1553            MVI  A,0
0909 119CFF    1554            LXI  D,-100
090C 19        1555            DAD  D
090D 3C        1556            INR  A
090E DA0C09    1557            JC   $-2
0911 116400    1558            LXI  D,100
0914 19        1559            DAD  D
0915 C62F      1560            ADI  2FH
0917 323522    1561            STA  ASCBUF+5
091A 3E00      1562            MVI  A,0
091C 11F6FF    1563            LXI  D,-10
091F 19        1564            DAD  D
0920 3C        1565            INR  A
0921 DA1F09    1566            JC   $-2
0924 110A00    1567            LXI  D,10
0927 19        1568            DAD  D
0928 C62F      1569            ADI  2FH
092A 323622    1570            STA  ASCBUF+6
092D 7D        1571            MOV  A,L
092E C630      1572            ADI  30H
0930 323722    1573            STA  ASCBUF+7
0933 212020    1574            LXI  H,2020H
0936 223022    1575            SHLD ASCBUF
0939 60        1576            MOV  H,B
093A 223222    1577            SHLD ASCBUF+2
093D C9        1578            RET
               1579
093E CDC009    1580   COMBO:   CALL KEYNEW
0941 FE14      1581            CPI  14H
0943 C0        1582            RNZ
0944 CDC009    1583            CALL KEYNEW
0947 FE16      1584            CPI  16H
0949 C0        1585            RNZ
094A CDC009    1586            CALL KEYNEW
094D FE15      1587            CPI  015H
094F C0        1588            RNZ
0950 CDC009    1589            CALL KEYNEW
0953 FE1D      1590            CPI  1DH
0955 C9        1591            RET
               1592
               1593
               1594
0956 0E00      1595   NUMCON:  MVI  C,0
0958 FE1B      1596            CPI  1BH
095A C8        1597            RZ
095B 0C        1598            INR  C
095C FE14      1599            CPI  14H
095E C8        1600            RZ
095F 0C        1601            INR  C
0960 FE18      1602            CPI  18H
0962 C8        1603            RZ
0963 0C        1604            INR  C
0964 FE1C      1605            CPI  1CH
0966 C8        1606            RZ
0967 0C        1607            INR  C
0968 FE15      1608            CPI  15H
096A C8        1609            RZ
096B 0C        1610            INR  C
096C FE19      1611            CPI  19H
096E C8        1612            RZ
096F 0C        1613            INR  C
0970 FE1D      1614            CPI  1DH
0972 C8        1615            RZ
0973 0C        1616            INR  C
0974 FE16      1617            CPI  16H
0976 C8        1618            RZ
0977 0C        1619            INR  C
0978 FE1A      1620            CPI  1AH
097A C8        1621            RZ
097B 0C        1622            INR  C
097C FE1E      1623            CPI  1EH
097E C9        1624            RET
               1625
097F 3A3F22    1626   KEYNO    LDA  KEYDAT
0982 C680      1627            ADI  80H
```

```
0984  F0           1628          RP
0985  3A4822       1629          LDA  RCVDTB
0988  C680         1630          ADI  80H
098A  F27F09       1631          JP   KEYNO
098D  324822       1632          STA  RCVDTB
0990  D686         1633          SUI  86H
0992  D601         1634          SUI  1
0994  3A4E22       1635          LDA  TEST
0997  17           1636          RAL
0998  0F           1637          RRC
0999  324E22       1638          STA  TEST
099C  DA7F09       1639          JC   KEYNO
099F  3A5722       1640          LDA  XMTPTR
09A2  FE55         1641          CPI  LOW (XMTBUF+6)
09A4  C27F09       1642          JNZ  KEYNO
09A7  211500       1643          LXI  H,015H
09AA  224F22       1644          SHLD XMTBUF
09AD  212020       1645          LXI  H,2020H
09B0  225122       1646          SHLD XMTBUF+2
09B3  2675         1647          MVI  H,75H
09B5  225322       1648          SHLD XMTBUF+4
09B8  3E4F         1649          MVI  A,LOW XMTBUF
09BA  325722       1650          STA  XMTPTR
09BD  C37F09       1651          JMP  KEYNO
                   1652
09C0  3A3F22       1653 KEYNEW:  LDA  KEYDAT
09C3  C680         1654          ADI  80H
09C5  FACC09       1655          JM$+7
09C8  323F22       1656          STA  KEYDAT
09CB  C9           1657          RET
                   1658          ;
09CC  3A4822       1659          LDA  RCVDTB
09CF  C680         1660          ADI  80H
09D1  F2C009       1661          JP   KEYNEW
09D4  E1           1662          POP  H
09D5  C36F03       1663          JMP  ALOC
                   1664
                   1665
09D8  F5           1666 RST55:   PUSH PSW
09D9  E5           1667          PUSH H
09DA  3A0227       1668          LDA  U14PB
09DD  EE80         1669          XRI  080H
09DF  320227       1670          STA  U14PB
09E2  F2210A       1671          JP   EXIT5
                   1672
09E5  3A5822       1673          LDA  AFLAG
09E8  87           1674          ADD  A
09E9  D2F909       1675          JNC  RST55A
09EC  FA210A       1676          JM   EXIT5
                   1677
09EF  2A5A22       1678          LHLD NCOUNT
09F2  23           1679          INX  H
09F3  225A22       1680          SHLD NCOUNT
09F6  C3210A       1681          JMP  EXIT5
                   1682
09F9  F2140A       1683 RST55A:  JP   RST55B
09FC  3E43         1684          MVI  A,043H
09FE  320027       1685          STA  U14CTL
0A01  3EC3         1686          MVI  A,0C3H
0A03  320027       1687          STA  U14CTL
0A06  3E40         1688          MVI  A,40H
0A08  325922       1689          STA  BFLAG
0A0B  210000       1690          LXI  H,0
0A0E  225A22       1691          SHLD NCOUNT
0A11  C3210A       1692          JMP  EXIT5
                   1693
0A14  3E43         1694 RST55B:  MVI  A,043H
0A16  320027       1695          STA  U14CTL
0A19  3EC0         1696          MVI  A,0C0H
0A1B  325822       1697          STA  AFLAG
0A1E  3E09         1698          MVI  A,09H
0A20  30           1699          SIM
                   1700
                   1701
0A21  E1           1702 EXIT5:   POP  H
```

```
0A22 F1         1703         POP PSW
0A23 FB         1704         EI
0A24 C9         1705         RET
                1706
0A25 F5         1707 RST65   PUSH PSW
0A26 E5         1708         PUSH H
0A27 3A0227     1709         LDA U14PB
0A2A 3D         1710         DCR A
0A2B 320227     1711         STA U14PB
0A2E F602       1712         ORI 02H
0A30 320227     1713         STA U14PB
                1714
0A33 3A5922     1715         LDA BFLAG
0A36 87         1716         ADD A
0A37 FA510A     1717         JM RST65A
0A3A D2800A     1718         JNC EXIT6
0A3D 2A5C22     1719         LHLD LCOUNT
0A40 2B         1720         DCX H
0A41 225C22     1721         SHLD LCOUNT
0A44 7C         1722         MOV A,H
0A45 B5         1723         ORA L
0A46 C2800A     1724         JNZ EXIT6
0A49 3EC0       1725         MVI A,0C0H
0A4B 325922     1726         STA BFLAG
0A4E C3800A     1727         JMP EXIT6
                1728
0A51 DA6F0A     1729 RST65A: JC RST65B
0A54 3E43       1730         MVI A,043H
0A56 320027     1731         STA U14CTL
0A59 3EC2       1732         MVI A,0C2H
0A5B 320026     1733         STA U15CTL
0A5E 3E80       1734         MVI A,080H
0A60 325822     1735         STA AFLAG
0A63 325922     1736         STA BFLAG
0A66 213F0B     1737         LXI H,2879
0A69 225C22     1738         SHLD LCOUNT
0A6C C3800A     1739         JMP EXIT6
                1740
0A6F 3E42       1741 RST65B: MVI A,042H
0A71 320026     1742         STA U15CTL
0A74 3EC3       1743         MVI A,0C3H
0A76 320027     1744         STA U14CTL
0A79 AF         1745         XRA A
0A7A 325822     1746         STA AFLAG
0A7D 325922     1747         STA BFLAG
0A80 E1         1748 EXIT6.  POP H
0A81 F1         1749         POP PSW
0A82 FB         1750         EI
0A83 C9         1751         RET
                1752
                1753         END
```

PUBLIC SYMBOLS

EXTERNAL SYMBOLS

USER SYMBOLS

```
ADJUST A 07C7    AFIRST A 225E    AFLAG  A 2258    ALAST  A 2264
ALEDS  A 223A    ALOC   A 036F    ASCBUF A 2230    ASCFG  A 223B
ASCLOP A 08BB    ASCON  A 08B4    BADCAL A 04BA    BAUD   A 3802
BAUDRT A 01F1    BAUDTB A 0211    BCDCAN A 08E5    BCDCON A 08D3
BFIRST A 226A    BFLAG  A 2259    BLAST  A 2270    BLEDS  A 223B
BLOC   A 04DE    BREAK  A 06CB    CBUFF  A 3804    CHKSM  A 3800
CHKSM1 A 01D9    CHKSUM A 01C8    CLIP   A 0757    CLOP   A 072D
CMOS   A 3800    COMBO  A 093E    CVAL   A 380A    DIPP   A 061E
DIPS   A 045B    DISPLY A 2000    DIV55  A 0852    DIV8   A 224B
DIVLOP A 085B    DIVNOT A 0897    DIVSUB A 0884    DLY100 A 032F
DLYMS  A 0372    DODO   A 07E5    DOWN4  A 0848    DOWN5  A 06J7
DOWNH  A 084C    DSPLY  A 0245    DSPLY1 A 0254    DSPLY2 A 025E
ENDTST A 0440    EXEC   A 033F    EXIT5  A 0A21    EXIT6  A 0A80
EXTRIG A 0466    FAULT  A 095F    FILMEM A 0323    FILMM2 A 0325
INIT1  A 0225    INTRIG A 06D6    KBDINP A 2603    KBDSCN A 2602
KEYBD  A 0178    KEYBD1 A 01A6    KEYBD2 A 01B0    KEYBD3 A 01B8
```

| | | | | | | | |
|---|---|---|---|---|---|---|---|
| KEYBDR | A 01C7 | KEYDAT | A 223F | KEYNEW | A 09C0 | KEYNO | A 097F |
| KEYSAV | A 223E | KYSHF1 | A 223D | LABLK | A 06FF | LCOUNT | A 225C |
| LEDST | A 2239 | MDONE | A 05B7 | MEM | A 3803 | MESG1 | A 021D |
| MULT5 | A 0807 | MULTLP | A 081E | NCOUNT | A 225A | NOADD | A 0841 |
| NUMCON | A 0956 | NUREY | A 0395 | NXTST | A 03F1 | OLDTRG | A 2281 |
| OPTOIN | A 2601 | PWRUP | A 0000 | PWRUP2 | A 003F | QUARK | A 06AC |
| QUME | A 0699 | RATIO | A 227C | RCVCT | A 2246 | RCVCT3 | A 2245 |
| RCVDTA | A 2247 | RCVDTB | A 2248 | RS55 | A 002C | RS65 | A 0034 |
| RS75 | A 003C | RST55 | A 09D8 | RST55A | A 09F9 | RST55B | A 0A14 |
| RST65 | A 0A25 | RST65A | A 0A51 | RST65B | A 0A6F | RST75 | A 0055 |
| RST751 | A 00E0 | RST752 | A 00F8 | RST753 | A 010F | RST754 | A 011B |
| RST755 | A 014C | RST756 | A 0158 | RST757 | A 016F | RST758 | A 0172 |
| RST75A | A 006B | RST75B | A 009A | RST75C | A 00AB | RST75D | A 00B1 |
| RST75E | A 00CB | SCANCT | A 223C | SEGTBL | A 0296 | SOFDIV | A 224A |
| SOFDV2 | A 2249 | STCK | A 2230 | SUB3 | A 07BB | TCOUNT | A 227F |
| TEST | A 224E | TRP | A 0024 | U14CTL | A 2700 | U14PA | A 2701 |
| U14PB | A 2702 | U14PC | A 2703 | U14RAM | A 2200 | U14TMR | A 2704 |
| U15CTL | A 2600 | U15RAM | A 2300 | U15TMR | A 2604 | UDATIN | A 0471 |
| USTSTR | A 2240 | XFRDN | A 0316 | XMTBUF | A 224F | XMTCT | A 2242 |
| XMTCT3 | A 2241 | XMTDTA | A 2244 | XMTDTB | A 2243 | XMTPTR | A 2257 |
| ZLOC | A 07A9 | | | | | | |

After the effective rolling radius of a tire has been determined in accordance with the present invention, the tire can be mounted on a first steerable, driving wheel of the vehicle 11. The effective rolling radius of a second tire can then be measured. If the torque steer effect is to be reduced, the second tire will be mounted on a second, steerable wheel of the vehicle 11 only if the effective rolling radii of the two tires are substantially the same, i.e., within 0.060 inch of each other.

Those skilled in the art will recognize that only a single form of a preferred embodiment has been disclosed and that the preferred embodiment can be modified without departing from the spirit and scope of the invention. Thus, for example, a determination of the effective rolling radius should be considered the equivalent of a determination of the effective rolling diameter or the effective rolling circumference. Similarly, the order in which the invention is carried out may be altered without significantly changing the results achieved. For example, the tire 57 may be inflated either before or during rotation and a first tire may be mounted on the vehicle 11 either before or after a second tire is tested to see if it also should be mounted on the vehicle 11.

What is claimed is:

1. A method of testing a tire in order to reduce a torque steer effect when said tire is used with an automotive vehicle comprising, in combination, the steps of:
   inserting said tire between opposed chucks of a measuring device and closing said chucks upon said tire;
   inflating said tire;
   simultaneously applying a load to said tire and revolving said tire; and
   determining an effective rolling radius of said tire as said tire revolves under said load.

2. A method of testing a tire as claimed in claim 1 wherein the step of determining an effective rolling radius of said tire comprises the step of measuring an effective rolling circumference of said tire as said tire revolves under said load.

3. A method of testing a tire in order to reduce a torque steer effect when said tire is used with an automotive vehicle comprising, in combination, the steps of:
   inflating said tire;
   engaging against said tire a rolling load drum having a predetermined radius; and
   determining an effective rolling radius of said tire as said tire revolves against said rolling load drum.

4. A method of testing a tire as claimed in claim 3 wherein the step of determining an effective rolling radius of said tire comprises the step of measuring an effective rolling circumference of said tire as said tire revolves under said load.

5. A method of testing a tire as claimed in claim 4 wherein said tire and said rolling load drum each exhibit a rotational speed and the step of measuring an effective rolling radius of said tire comprises the steps of:
   generating a first speed signal having a first value representing said rotational speed of said rolling load drum;
   generating a second speed signal having a second value representing said rotational speed of said tire; and
   comparing said first and second values.

6. A method of testing a tire as claimed in claim 5 wherein the step of simultaneously applying a load to said tire and revolving said tire includes the step of revolving said tire at least twice.

7. A method of testing a tire as claimed in claim 5 wherein said second speed signal comprises at least two electrical pulses.

8. A method of testing a tire as claimed in claim 7 wherein a first electrical pulse is generated when said tire is at a first position and a second electrical pulse is generated when said tire is rotated no more than one degree from said first position.

9. In a tire manufacturing process including the steps of assembling and curing components to form a tire, subjecting said tire to a test, and shipping said tire to customers only if said tire passes said test, an improved method for testing said tire comprising, in combination, the steps of:
   inserting said tire between opposed chucks of a testing device;
   inflating said tire;
   simultaneously applying a load to said tire and revolving said tire;
   determining an effective rolling radius of said tire as said tire revolves under said load and checking whether said effective rolling radius meets a predetermined standard;
   removing said tire from said opposed chucks of said testing device; and
   indicating whether said effective rolling radius of said tire meets said predetermined standard.

10. A method as claim in claim 9 wherein the step of determining an effective rolling radius of said tire as said tire revolves under said load and checking whether said effective rolling radius meets a predetermined standard comprises the steps of:
  measuring an effective rolling circumference of said tire as said tire revolves under said load;
  comparing said effective rolling circumference with a predetermined standard.

11. A method as claimed in claim 9 wherein the step of simultaneously applying a load to said tire comprises the step of engaging against said tire a rolling load drum having a predetermined radius.

12. A method as claimed in claim 11 wherein the step of determining an effective rolling radius of said tire as said tire revolves under said load and checking whether said effective rolling radius meets a predetermined standard comprises the step of measuring an effective rolling circumference of said tire as said tire revolves under said load and checking whether said effective rolling circumference meets a predetermined standard.

13. A method as claimed in claim 12 wherein said tire and said rolling load drum each exhibit a rotational speed and the step of determining an effective rolling radius of said tire as said tire revolves under said load and checking whether said effective rolling radius meets a predetermined standard comprises the steps of:
  generating a first speed signal having a first value representing said rotational speed of said rolling load drum;
  generating a second speed signal having a second value representing said rotational speed of said tire; and
  comparing said first and second values.

14. A method of determining whether first and second tires should be mounted on first and second steerable, automotive wheels adapted to carry first and second tires in order to reduce a torque steer effect created by a rotation of said tires on a roadway comprising, in combination, the steps of:
  inflating said first tire;
  simultaneously applying a load to said first tire and revolving said first tire;
  determining an effective rolling radius of said first tire as said first tire revolves under said load;
  inflating said second tire;
  simultaneously applying said load to said second tire and revolving said second tire;
  determining an effective rolling radius of said second tire as said second tire revolves under said load; and
  comparing said effective rolling radii of said first and second tires,
  whereby said first and second tires should be mounted on said first and second steerable, automotive wheels only if said effective rolling radii of said first and second tires are substantially the same.

15. A method of as claimed in claim 14 wherein:
  the step of determining an effective rolling radius of said first tire comprises the step of measuring an effective rolling circumference of said first tire as said first tire revolves under said load; and
  the step of determining an effective rolling radius of said second tire comprises the step of measuring an effective rolling circumference of said second tire as said second tire revolves under said load.

16. In a tire manufacturing system including means for assembling and curing components to form a tire and for testing said tire after said tire has been formed in order to reduce a torque steer effect when said tire is used with an automotive vehicle, an improved apparatus for testing said tire comprising, in combination:
  opposed chuck means for receiving said tire, said chuck means including air means for inflating said tire;
  machine means for simultaneously applying a load to said tire and revolving said tire;
  indicator means for determining an effective rolling radius of said tire as said tire revolves under said load.

17. An improved apparatus for testing said radius of said tire as claimed in claim 16 wherein said indicator means includes measurement means for measuring an effective rolling circumference of said tire as said tire revolves under said load.

18. In a tire manufacturing system including means for assembling and curing components to form a tire and for testing said tire after said tire has been formed in order to reduce a torque steer effect when said tire is used with an automotive vehicle, an improved apparatus for testing said tire comprising, in combination:
  air means for inflating said tire;
  a rolling load drum having a predetermined radius;
  pressure means, interconnected with said rolling drum, for engaging said rolling load drum against said tire; and
  indicator means for determining an effective rolling radius of said tire as said tire revolves against said rolling load drum.

19. An improved apparatus for testing said radius of said tire as claimed in claim 18 wherein said indicator means includes measurement means for measuring an effective rolling circumference of said tire as said tire revolves under said load.

20. An improved apparatus for testing said radius of said tire as claimed in claim 19 wherein said tire and said rolling load drum each exhibit a rotational speed and said measurement means further comprises:
  first detector means, associated with said rolling load drum, for generating a first speed signal having a first value representing said rotational speed of said rolling load drum;
  second detector means, associated with said tire, for generating a second signal having a second value representing said rotational speed of said tire; and
  counter means for comparing said first and second values.

21. An improved apparatus for testing said radius of said tire as claimed in claim 20 wherein:
  said first and second speed signals include, respectively, a first and second series of pulses;
  said counter means counts said first series of pulses for a first interval; and
  said counter means counts said second series of pulses for a second interval.

22. An improved apparatus for testing said radius of said tire as claimed in claim 21 wherein said second speed signal comprises at least two electrical pulses.

23. An improved apparatus for testing said radius of said tire as claimed in claim 22 wherein said second detector means generates a first electrical pulse when said tire is at a first position and generates a second electrical pulse when said tire is rotated no more than one degree from said first position.

24. An improved apparatus for testing said radius of said tire as claimed in claim 23 wherein said pressure means includes a mechanical jack for forcing said rolling load drum against said tire.

* * * * *